United States Patent
Wu et al.

(10) Patent No.: US 10,251,135 B2
(45) Date of Patent: Apr. 2, 2019

(54) METHOD FOR CONTROLLING POWER OF CARRIER SIGNAL, USER EQUIPMENT, AND BASE STATION

(71) Applicant: HUAWEI TECHNOLOGIES CO., LTD., Shenzhen, Guangdong (CN)

(72) Inventors: Tong Wu, Shenzhen (CN); Hong Li, Beijing (CN); Anjian Li, Beijing (CN); Jie Cui, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 88 days.

(21) Appl. No.: 15/346,196

(22) Filed: Nov. 8, 2016

(65) Prior Publication Data
US 2017/0055227 A1 Feb. 23, 2017

Related U.S. Application Data

(63) Continuation of application No. PCT/CN2014/077128, filed on May 9, 2014.

(51) Int. Cl.
*H04W 52/04* (2009.01)
*H04W 52/24* (2009.01)
(Continued)

(52) U.S. Cl.
CPC ............. *H04W 52/24* (2013.01); *H04L 5/001* (2013.01); *H04W 52/146* (2013.01);
(Continued)

(58) Field of Classification Search
CPC . H04W 52/24; H04W 52/242; H04W 52/281; H04W 52/146; H04W 52/367;
(Continued)

(56) References Cited

U.S. PATENT DOCUMENTS 8,571,488 B2 * 10/2013 Cai ............... H04B 7/0404
455/101
2006/0229025 A1 * 10/2006 Gandhi ............ H04W 52/12
455/69
(Continued)

FOREIGN PATENT DOCUMENTS

CN 101868010 10/2010
CN 101981979 A 2/2011
(Continued)

OTHER PUBLICATIONS

International Search Report dated Feb. 26, 2015 in corresponding International Application No. PCT/CN2014/077128.
(Continued)

*Primary Examiner* — Phuc H Tran
(74) *Attorney, Agent, or Firm* — Staas & Halsey LLP

(57) ABSTRACT

Embodiments of the present invention provide a method for controlling power of a carrier signal, user equipment, and a base station. The method includes: receiving, by user equipment, power control parameters, sent by at least one base station, of at least two carrier signals, where the at least two carrier signals are signals sent on at least two aggregation carriers; determining, by the user equipment according to the power control parameters, channel gain reference quantities corresponding to the at least two carrier signals, where the channel gain reference quantities are used to represent a magnitude of a channel gain; and controlling, by the user equipment, power of the at least two carrier signals according to the channel gain reference quantities. According to the technical solutions of the present invention, a power resource of user equipment can be effectively utilized, and network performance can be improved.

20 Claims, 6 Drawing Sheets

(51) Int. Cl.
*H04W 52/36* (2009.01)
*H04L 5/00* (2006.01)
*H04W 52/14* (2009.01)
*H04W 52/28* (2009.01)
*H04W 76/15* (2018.01)
*H04W 52/26* (2009.01)
*H04W 52/34* (2009.01)
*H04W 76/02* (2009.01)

(52) U.S. Cl.
CPC ....... *H04W 52/242* (2013.01); *H04W 52/281* (2013.01); *H04W 52/367* (2013.01); *H04W 52/243* (2013.01); *H04W 52/267* (2013.01); *H04W 52/34* (2013.01); *H04W 76/025* (2013.01); *H04W 76/15* (2018.02)

(58) Field of Classification Search
CPC ... H04W 76/15; H04W 52/34; H04W 52/243; H04W 52/267; H04W 76/025; H04L 5/001
See application file for complete search history.

(56) References Cited

U.S. PATENT DOCUMENTS

| | | | |
|---|---|---|---|
| 2007/0263574 | A1 | 11/2007 | Lu et al. |
| 2011/0038271 | A1* | 2/2011 | Shin ............... H04W 52/08 370/252 |
| 2011/0081936 | A1 | 4/2011 | Haim et al. |
| 2011/0237288 | A1* | 9/2011 | Ratasuk ........... H04W 52/146 455/522 |
| 2012/0002636 | A1 | 1/2012 | Xiao et al. |
| 2012/0250548 | A1 | 10/2012 | Swaminathan et al. |
| 2013/0182654 | A1* | 7/2013 | Hariharan ........ H04W 52/54 370/329 |
| 2015/0043465 | A1* | 2/2015 | Ouchi ............... H04W 16/28 370/329 |

FOREIGN PATENT DOCUMENTS

| | | |
|---|---|---|
| CN | 101984700 A | 3/2011 |
| CN | 102065455 A | 5/2011 |
| CN | 102118843 | 7/2011 |
| CN | 102186232 | 9/2011 |
| CN | 102233713 | 11/2011 |
| WO | 2011/119249 | 9/2011 |
| WO | 2014/173329 | 10/2014 |

OTHER PUBLICATIONS

International Search Report dated Feb. 26, 2015, in corresponding International Patent Application No. PCT/CN2014/077128.
Extended European Search Report dated Apr. 7, 2017, in corresponding European Patent Application No. 14891538.2.
Alcatel-Luncent Shanghai Bell Et Al. "PUSCH Power Control for Carrier Aggregation", 3GPP Draft: R1-093770, $3^{rd}$ Generation Partnership Project (3GPP), Mobile Competence Centre, 650. Routes Des Lucioles; ; F-06921 Sophia Antipolis Cedex: France no. Miyazaki; Oct. 12, 2009, XPO50388290, retrieved on Oct. 12, 2009.
Texas Instruments: "Further Details on LTE-A UL Power Control", 3GPP Draft; R1-100449 TI LTE-AL UL Power Control R1, $3^{rd}$ Generation Partnership Project (3GPP) Mobile Competence Centre, 650. Routes Des Lucioles; ; F-06921 Sophia Antipolis Cedex: France, vol. RAN WG1, no. Valencia, Spain; Jan. 18, 2010, retrieved on Jan. 12, 2010.
Chinese Office Action dated Aug. 31, 2018 in related Chinese Patent Application No. 201480030221.1 (10 pages).

* cited by examiner

METHOD FOR CONTROLLING POWER OF CARRIER SIGNAL, USER EQUIPMENT, AND BASE STATION

CROSS-REFERENCE TO RELATED APPLICATIONS

This application is a continuation of International Application No. PCT/CN2014/077128, filed on May 9, 2014, the disclosure of which is hereby incorporated by reference in its entirety.

TECHNICAL FIELD

The present invention relates to the communications field, and more specifically, to a method for controlling power of a carrier signal, user equipment, and a base station.

BACKGROUND

Mobile communications technologies develop rapidly, and operators provide a network with an increasingly higher transmission rate to meet a demand of people for high-speed mobile communication. Innovation and evolution of a mobile network are a gradual process, and different networks have different application focuses. For example, a GSM (Global System for Mobile Communications) mainly focuses on voice services, a WCDMA (Wideband Code Division Multiple Access) system and the like focus on both voice and data services, and an LTE (Long Term Evolution) system focuses on high-speed data services. Therefore, a future mobile communications network may face a situation in which radio transmission technologies of multiple standards coexist. A carrier aggregation technology is destined to be the focus of attention of the industry. Existing carrier aggregation includes: intra-RAT (intra-radio access technology) carrier aggregation (CA), that is, carrier aggregation in a same standard; and multi-RATCA, that is, carrier aggregation in multiple standards, which may be also referred to as inter-RAT CA (inter-RAT carrier aggregation).

In a current carrier aggregation technology, user equipment may determine power of different carrier signals according to power control parameters. When a sum of the determined power of all the carrier signals is greater than a maximum transmit power of the user equipment, the user equipment may reduce the power of the different carrier signals in equal proportion to make a sum of power of the different carrier signals less than or equal to the maximum transmit power of the user equipment. However, in an actual network, transmission quality of different carrier signals is usually different in a same standard or in different standards.

Therefore, in a control method in the prior art for determining power of different carrier signals only according to power control parameters or reducing power of different carrier signals in equal proportion after the power of the different carrier signals are determined according to power control parameters, a power resource of user equipment cannot be effectively utilized.

SUMMARY

Embodiments of the present invention provide a method for controlling power of a carrier signal, user equipment, and a base station, so as to effectively utilize a power resource of the user equipment and improve network performance.

According to a first aspect, a method for controlling power of a carrier signal is provided, including: receiving, by user equipment, power control parameters, sent by at least one base station, of at least two carrier signals, where the at least two carrier signals are signals sent on at least two aggregation carriers; determining, by the user equipment according to the power control parameters, channel gain reference quantities corresponding to the at least two carrier signals, where the channel gain reference quantities are used to represent a magnitude of the channel gain; and controlling, by the user equipment, power of the at least two carrier signals according to the channel gain reference quantities.

With reference to the first aspect, in a first possible implement manner, before the determining, by the user equipment according to the power control parameters, channel gain reference quantities corresponding to the at least two carrier signals, the method further includes: determining, by the user equipment, that a sum of the power of the at least two carrier signals is greater than a maximum transmit power supported by the user equipment.

With reference to the first aspect or the first possible implementation manner, in a second possible implement manner, the controlling, by the user equipment, power of the at least two carrier signals according to the channel gain reference quantities includes: determining, by the user equipment, a carrier signal corresponding to a minimum channel gain reference quantity; and determining, by the user equipment, a power corresponding to a minimum bit error ratio that meets transmission of the carrier signal as a power of the carrier signal.

With reference to any one of the first aspect, or the first or the second possible implementation manner, in a third possible implementation manner, the at least one base station includes a primary base station, the at least two carrier signals include a first carrier signal and a second carrier signal, and the receiving, by user equipment, power control parameters, sent by at least one base station, of at least two carrier signals includes: receiving, by the user equipment, a power control parameter of the first carrier signal and a power control parameter of the second carrier signal that are sent by the primary base station, where the power control parameter of the first carrier signal and the power control parameter of the second carrier signal are determined by the primary base station, or the power control parameter of the first carrier signal is determined by the primary base station, and the power control parameter of the second carrier signal is determined by a secondary base station and is sent to the primary base station.

With reference to any one of the first aspect, or the first or the second possible implementation manner, in a fourth possible implement manner, the at least one base station includes a primary base station and a secondary base station, the at least two carrier signals include a first carrier signal and a second carrier signal, and the receiving, by user equipment, power control parameters, sent by at least one base station, of at least two carrier signals includes: receiving, by the user equipment, a power control parameter, sent by the primary base station, of the first carrier signal; and receiving, by the user equipment, a power control parameter, sent by the secondary base station, of the second carrier signal.

With reference to any one of the first aspect, or the first to the fourth possible implementation manners, in a fifth possible implement manner, the channel gain reference quantities corresponding to the at least two carrier signals include a first channel gain reference quantity corresponding to the first carrier signal and a second channel gain reference quantity corresponding to the second carrier signal; the power control parameters include I_psd_1, G1, I_psd_2, and G2, where G1 is a first path loss from the user equipment to the base station, I_psd_1 is an interference power spectrum of the user equipment on a first carrier frequency, G2 is a second path loss from the user equipment to the base station, and I_psd_2 is an interference power spectrum of the user equipment on a second carrier frequency; and the determining, by the user equipment according to the power control parameters, channel gain reference quantities corresponding to the at least two carrier signals includes: determining, by the user equipment, the first channel gain reference quantity according to the following formula: $\alpha 1 = G1/(I\_psd\_1 * \gamma 1)$, where $\alpha 1$ is the first channel gain reference quantity, and $\gamma 1$ is a first bit error ratio that meets transmission of the first carrier signal; and determining, by the user equipment, the second channel gain reference quantity according to the following formula: $\alpha 2 = G2/(I\_sd\_2 * \gamma 2)$, where $\alpha 2$ is the second channel gain reference quantity, and $\gamma 2$ is a second bit error ratio that meets transmission of the second carrier signal.

With reference to the fifth possible implementation manner, in a sixth possible implementation manner, the controlling, by the user equipment, power of the at least two carrier signals according to the channel gain reference quantities includes: determining that the first channel gain is less than the second channel gain; determining a power of the first carrier signal according to the following formula: $P1 = P1\_min = P_{01} * (1-\gamma 1)/G1$, where P1 is the power of the first carrier signal, P1_min is a power corresponding to a minimum bit error ratio that meets transmission of the first carrier signal, and $P_{01}$ is an expected power value of the first carrier signal; and determining a power of the second carrier signal according to the following formula: $P2 = P\_ue\_max - P1$, where P2 is the power of the second carrier signal, and P_ue_max is the maximum transmit power supported by the user equipment.

With reference to the fifth possible implementation manner, in a seventh possible implementation manner, the controlling, by the user equipment, power of the at least two carrier signals according to the channel gain reference quantities includes: determining that the first channel gain reference quantity is equal to the second channel gain reference quantity; and determining a power of the first carrier signal and a power of the second carrier signal according to the following formula: $P1 = P2 = P\_ue\_max/2$, where P1 is the power of the first carrier signal, P2 is the power of the second carrier signal, and P_ue_max is the maximum transmit power supported by the user equipment.

With reference to any one of the first aspect, or the first to the seventh possible implementation manners, in an eighth possible implementation manner, the at least two carrier signals are carrier signals of same radio access or carrier signals of different radio access.

According to a second aspect, a method for controlling power of a carrier signal is provided, including: determining, by a first base station, a power control parameter of at least one carrier signal of at least two carrier signals, where the at least two carrier signals are signals sent on at least two aggregation carriers; and sending, by the first base station, the power control parameter of the at least one carrier signal to user equipment, so that the user equipment controls a power of the at least one carrier signal according to the power control parameter of the at least one carrier signal, where the power control parameter of the at least one carrier signal includes at least an interference power spectrum corresponding to the at least one carrier signal.

With reference to the first aspect, in a first possible implement manner, the power control parameter of the at least one carrier signal includes a power control parameter of a first carrier signal.

With reference to the first aspect, in a second possible implement manner, the at least two carrier signals include a first carrier signal and a second carrier signal, the power control parameter of the at least one carrier signal includes a power control parameter of the first carrier signal and a power control parameter of the second carrier signal, and the determining, by a first base station, a power control parameter of at least one carrier signal of at least two carrier signals includes: determining, by the first base station, the power control parameter of the first carrier signal and the power control parameter of the second carrier signal; or determining, by the first base station, the power control parameter of the first carrier signal, and receiving the power control parameter, determined by a second base station, of the second carrier signal.

According to a third aspect, a method for controlling power of a carrier signal is provided, including: determining, by a second base station, a power control parameter of at least one carrier signal of at least two carrier signals, where the at least two carrier signals are signals sent on at least two aggregation carriers; and sending, by the second base station, the power control parameter of the at least one carrier signal to a first base station, so that user equipment controls a power of the at least one carrier signal according to the power control parameter, sent by the first base station, of the at least one carrier signal, where the power control parameter of the at least one carrier signal includes at least an interference power spectrum corresponding to the at least one carrier signal.

According to a fourth aspect, user equipment is provided, including: a receiving unit, configured to receive power control parameters, sent by at least one base station, of at least two carrier signals, where the at least two carrier signals are signals sent on at least two aggregation carriers; a first determining unit, configured to determine, according to the power control parameters, channel gain reference quantities corresponding to the at least two carrier signals, where the channel gain reference quantities are used to represent a magnitude of the channel gain; and a control unit, configured to control power of the at least two carrier signals according to the channel gain reference quantities.

With reference to the fourth aspect, in a first possible implement manner, the user equipment further includes: a second determining unit, configured to determine that a sum of the power of the at least two carrier signals is greater than a maximum transmit power supported by the user equipment.

With reference to the fourth aspect or the first possible implementation manner of the fourth aspect, in a second possible implement manner, the control unit determines a carrier signal corresponding to a minimum channel gain reference quantity, and determines a power corresponding to a minimum bit error ratio that meets transmission of the carrier signal as a power of the carrier signal.

With reference to any one of the fourth aspect, or the first or the second possible implementation manner of the fourth aspect, in a third possible implementation manner, the at least one base station includes a primary base station, the at least two carrier signals include a first carrier signal and a second carrier signal, and the receiving unit receives a power control parameter of the first carrier signal and a power control parameter of the second carrier signal that are sent by the primary base station, where the power control parameter of the first carrier signal and the power control parameter of the second carrier signal are determined by the primary base station, or the power control parameter of the first carrier signal is determined by the primary base station, and the power control parameter of the second carrier signal is determined by a secondary base station and is sent to the primary base station.

With reference to any one of the fourth aspect, or the first or the second possible implementation manner of the fourth aspect, in a fourth possible implement manner, the at least one base station includes a primary base station and a secondary base station, the at least two carrier signals include a first carrier signal and a second carrier signal, and the receiving unit receives a power control parameter, sent by the primary base station, of the first carrier signal, and receives a power control parameter, sent by the secondary base station, of the second carrier signal.

With reference to any one of the fourth aspect, or the first to the fourth possible implementation manners of the fourth aspect, in a fifth possible implement manner, the channel gain reference quantities corresponding to the at least two carrier signals include a first channel gain reference quantity corresponding to the first carrier signal and a second channel gain reference quantity corresponding to the second carrier signal; the power control parameters include I_psd_1, G1, I_psd_2, and G2, where G1 is a first path loss from the user equipment to the base station, I_psd_1 is an interference power spectrum of the user equipment on a first carrier frequency, G2 is a second path loss from the user equipment to the base station, and I_psd_2 is an interference power spectrum of the user equipment on a second carrier frequency; the first determining unit determines the first channel gain reference quantity according to the following formula: $\alpha1=G/(I\_psd\_1*\gamma1)$, where $\alpha1$ is the first channel gain reference quantity, and $\gamma1$ is a first bit error ratio that meets transmission of the first carrier signal; and the first determining unit determines the second channel gain reference quantity according to the following formula:

$$\alpha2=G2/(I\_psd\_2*\gamma2),$$

where $\alpha2$ is the second channel gain reference quantity, and $\gamma2$ is a second bit error ratio that meets transmission of the second carrier signal.

With reference to the fifth possible implementation manner of the fourth aspect, in a sixth possible implementation manner, the control unit determines that the first channel gain is less than the second channel gain; determines a power of the first carrier signal according to the following formula: $P1=P1\_min=P_{01}*(1-\gamma1)/G1$, where P1 is the power of the first carrier signal, P1_min is a power corresponding to a minimum bit error ratio that meets transmission of the first carrier signal, and $P_{01}$ is an expected power value of the first carrier signal; and determines a power of the second carrier signal according to the following formula: $P2=P\_ue\_max-P1$, where P2 is the power of the second carrier signal, and P_ue_max is the maximum transmit power supported by the user equipment.

With reference to the fifth possible implementation manner of the fourth aspect, in a seventh possible implementation manner, the control unit determines that the first channel gain reference quantity is equal to the second channel gain reference quantity, and determines a power of the first carrier signal and a power of the second carrier signal according to the following formula: $P1=P2=P\_ue\_max/2$, where P1 is the power of the first carrier signal, P2 is the power of the second carrier signal, and P_ue_max is the maximum transmit power supported by the user equipment.

With reference to any one of the fourth aspect, or the first to the seventh possible implementation manners of the fourth aspect, in an eighth possible implementation manner, the at least two carrier signals are carrier signals of same radio access or carrier signals of different radio access.

According to a fifth aspect, a base station is provided, including: a determining unit, configured to determine a power control parameter of at least one carrier signal of at least two carrier signals, where the at least two carrier signals are signals sent on at least two aggregation carriers; and a sending unit, configured to send the power control parameter of the at least one carrier signal to user equipment, so that the user equipment controls a power of the at least one carrier signal according to the power control parameter of the at least one carrier signal, where the power control parameter of the at least one carrier signal includes at least an interference power spectrum corresponding to the at least one carrier signal.

With reference to the fifth aspect, in a first possible implement manner, the power control parameter of the at least one carrier signal includes a power control parameter of a first carrier signal.

With reference to the fifth aspect, in a second possible implement manner, the at least two carrier signals include a first carrier signal and a second carrier signal, the power control parameter of the at least one carrier signal includes a power control parameter of the first carrier signal and a power control parameter of the second carrier signal, and the determining unit determines the power control parameter of the first carrier signal and the power control parameter of the second carrier signal, or the determining unit determines the power control parameter of the first carrier signal, and receives the power control parameter, determined by a second base station, of the second carrier signal.

According to a sixth aspect, a base station is provided, including: a determining unit, configured to determine a power control parameter of at least one carrier signal of at least two carrier signals, where the at least two carrier signals are signals sent on at least two aggregation carriers; and a sending unit, configured to send the power control parameter of the at least one carrier signal to a first base station, so that user equipment controls a power of the at least one carrier signal according to the power control parameter, sent by the first base station, of the at least one carrier signal, where the power control parameter of the at least one carrier signal includes at least an interference power spectrum corresponding to the at least one carrier signal.

Based on the foregoing technical solutions, user equipment may receive a power control parameter sent by a base station, determine a magnitude of a channel gain according to the power control parameter, and further control a power of a carrier signal according to the magnitude of the channel gain, so as to effectively utilize a power resource of the user equipment and improve network performance.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions in the embodiments of the present invention may be applied to various communications systems such as a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD), a Universal Mobile Telecommunications System (UMTS), or a Worldwide Interoperability for Microwave Access (WiMAX) communications system.

A base station may be a BTS (base transceiver station) in the GSM or the CDMA; an NB (NodeB) in the WCDMA; a BS (base station) in the UMTS; an eNodeB (Evolutional Node B, evolved NodeB) in the LTE, which is also referred to as an eNB; or the like, which is not limited in the present invention.

It should be further understood that in the embodiments of the present invention, user equipment (UE) includes, but is not limited to, a mobile station (MS), a mobile terminal, a mobile telephone, a handset, portable equipment, and the like. The user equipment may communicate with one or more core networks over a radio access network (RAN). For example, the user equipment may be a mobile phone (or referred to as a "cellular" phone) or a computer with a wireless communication function. The user equipment may be further a portable, pocket-sized, handheld, computer-embedded, or vehicle-mounted mobile apparatus.

It should be further understood that the user equipment in the embodiments of the present invention may be a device that supports an intra-RAT and/or multi-RAT CA capability.

Figure 1:
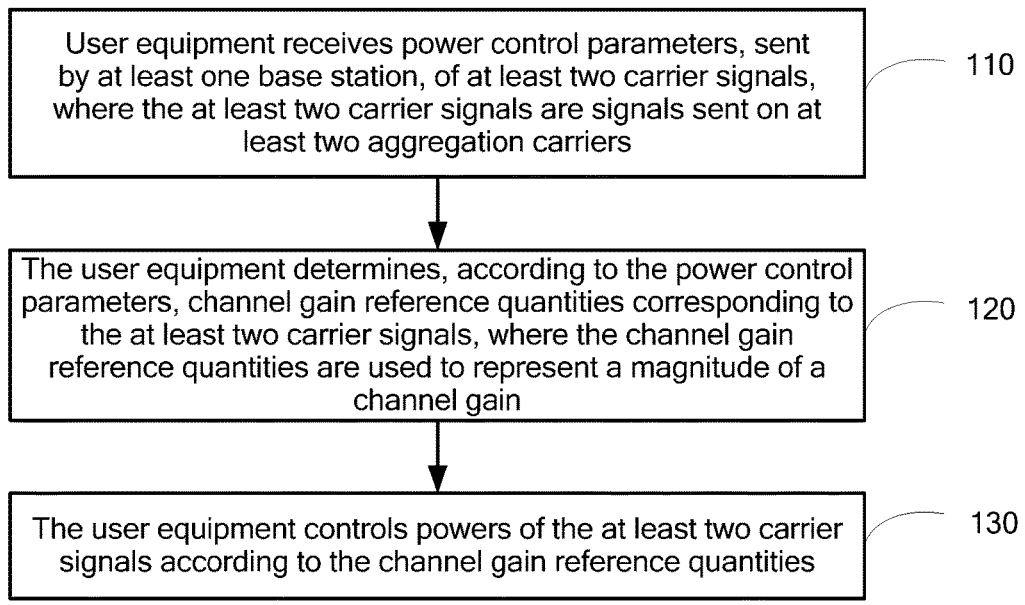
FIG. 1 is a schematic flowchart of a method for controlling power of a carrier signal according to an embodiment of the present invention.

FIG. 1 is a schematic flowchart of a method for controlling power of a carrier signal according to an embodiment of the present invention. The method is executed by user equipment. As shown in FIG. 1, the method includes:

110. The user equipment receives power control parameters, sent by at least one base station, of at least two carrier signals, where the at least two carrier signals are signals sent on at least two aggregation carriers.

Specifically, in a carrier aggregation scenario, the user equipment may receive a power control parameter, delivered by the at least one base station, of each carrier.

120. The user equipment determines, according to the power control parameters, channel gain reference quantities corresponding to the at least two carrier signals, where the channel gain reference quantities are used to represent a magnitude of a channel gain.

Specifically, the user equipment separately obtains, by means of calculation according to the power control parameters, the channel gain reference quantities corresponding to the at least two carrier signals, and then makes a comparison. For example, the user equipment determines, according to a bit error ratio, a path loss from the user equipment to the base station, and an interference power spectrum (Interference power spectral density, Interference PSD) that are corresponding to each carrier signal of the at least two carrier signals, a channel gain reference quantity corresponding to each carrier signal, which is not limited in this embodiment of the present invention. The channel gain reference quantity may be further a physical quantity that is obtained in another manner and can represent a magnitude of a channel gain.

130. The user equipment controls power of the at least two carrier signals according to the channel gain reference quantities.

Specifically, the user equipment controls transmit power of the at least two carrier signals according to a comparison result of the channel gain reference quantities corresponding to the at least two carrier signals.

In existing carrier signal aggregation, the user equipment determines a power of a carrier signal only according to a power control parameter without considering a situation of a channel gain. However, in actual application, transmission quality of different carrier signals is usually different. Therefore, in the prior art, a power resource of the user equipment cannot be effectively utilized. According to this embodiment of the present invention, the user equipment may receive a power control parameter sent by a base station, determine a channel gain reference quantity according to the power control parameter, further determine a magnitude of a channel gain, and then, control a power of a carrier signal according to the magnitude of the channel gain, so as to effectively utilize a power resource of the user equipment and improve network performance.

It should be understood that the aggregation carrier in this embodiment of the present invention may be a carrier in intra-RAT CA, or a carrier in multi-RAT CA, which is not limited in this embodiment of the present invention. In other words, the at least one base station in this embodiment of the present invention may include a primary base station, or include a primary base station and at least one secondary base station. The at least two carrier signals in this embodiment of the present invention may be carrier signals in a same standard or carrier signals in at least two standards. Specifically, when the at least one base station includes a primary base station, the power control parameters of the at least two carrier signals may include power control parameters of carrier signals in a same standard; and when the primary base station is a multimode base station, the power control parameters of the at least two carrier signals may further include power control parameters of multiple carrier signals in different standards. When the at least one base station includes a primary base station and at least one secondary base station, the power control parameters of the at least two carrier signals may include power control parameters of carrier signals in a same standard, or include power control parameters of multiple carrier signals in different standards, which is not limited in this embodiment of the present invention.

Optionally, in another embodiment, before the user equipment determines, according to the power control parameters, channel gains corresponding to the at least two carrier signals, the method in this embodiment of the present invention further includes: determining, by the user equipment, that a sum of the power of the at least two carrier signals is greater than a maximum transmit power supported by the user equipment.

Specifically, in this embodiment of the present invention, whether the sum of the power of the at least two carrier signals is greater than the maximum transmit power supported by the user equipment may be first determined according to an existing method. If the sum is greater than the maximum transmit power supported by the user equipment, the channel gain reference quantities of the at least two carrier signals are determined, and the power of the at least two carrier signals are controlled according to the channel gain reference quantities. If the sum is not greater than the maximum transmit power supported by the user equipment, a situation of a channel gain may not be considered.

In other words, in this embodiment of the present invention, the magnitudes of the channel gains of the at least two carrier signals may be determined directly according to power configuration parameters, and then, the power of the at least two carrier signals are determined according to the magnitudes of the gains and the power control parameters. In this embodiment of the present invention, alternatively, the power of the at least two carrier signals may be first determined according to the power control parameters, and whether the sum of the power of the at least two carrier signals is greater than the maximum transmit power supported by the user equipment is determined. If the sum is not greater than the maximum transmit power supported by the user equipment, no processing is performed. If the sum is greater than the maximum transmit power supported by the user equipment, the magnitudes of the channel gains of the at least two carrier signals are determined according to power configuration parameters, and then, the power of the at least two carrier signals are controlled according to the magnitudes of the gains.

Optionally, in another embodiment, in 130, the user equipment may first determine a carrier signal corresponding to a minimum channel gain reference quantity, and then, the user equipment determines a power corresponding to a minimum bit error ratio that meets transmission of the carrier signal as a power of the carrier signal.

In other words, the user equipment first determines a minimum value of the channel gain reference quantities corresponding to the at least two carrier signals, then, determines a carrier signal corresponding to the minimum value, determines, according to the power control parameters, a power corresponding to a minimum bit error ratio that meets transmission of the carrier signal, and determines the power as a power of the carrier signal. A sum of power of other carrier signals of the at least two carrier signals is a difference between the maximum transmit power supported by the user equipment and the power of the carrier signal.

It should be understood that the at least two carrier signals in this embodiment of the present invention may be signals corresponding to two carriers, or signals corresponding to multiple carriers, which is not limited in this embodiment of the present invention.

The following provides a detailed description by using an example of a scenario in which the at least two carrier signals are signals corresponding to two carriers.

Optionally, in another embodiment, the at least one base station includes a primary base station, and the at least two carrier signals include a first carrier signal and a second carrier signal. In 110, the user equipment receives a power control parameter of the first carrier signal and a power control parameter of the second carrier signal that are sent by the primary base station, where the power control parameter of the first carrier signal and the power control parameter of the second carrier signal are determined by the primary base station, or the power control parameter of the first carrier signal is determined by the primary base station, and the power control parameter of the second carrier signal is determined by a secondary base station and is sent to the primary base station.

In other words, when the at least one base station includes a primary base station, in a case, the power control parameters that are received by the user equipment and are sent by the primary base station may be determined and sent by the primary base station; and in another case, the power control parameter of the first carrier signal is determined by the primary base station, the power control parameter of the second carrier signal is determined by the secondary base station, the power control parameter of the second carrier signal is sent to the primary base station through an interface between the primary base station and the secondary base station, and the primary base station sends the power control parameter of the first carrier signal and the power control parameter of the second carrier signal to the user equipment.

Alternatively, in another embodiment, the at least one base station includes a primary base station and a secondary base station, and the at least two carrier signals include a first carrier signal and a second carrier signal. In 110, the user equipment receives a power control parameter, sent by the primary base station, of the first carrier signal, and the user equipment receives a power control parameter, sent by the secondary base station, of the second carrier signal.

According to this embodiment of the present invention, the channel gains of the at least two carrier signals include a first channel gain corresponding to the first carrier signal and a second channel gain corresponding to the second carrier signal, and the power control parameters include $I\_psd\_1$, $G1$, $I\_psd\_2$, and $G2$, where $G1$ is a first path loss from the user equipment to the base station, $I\_psd\_$ is an interference power spectrum of the user equipment on a first carrier frequency, $G2$ is a second path loss from the user equipment to the base station, and $I\_psd\_2$ is an interference power spectrum of the user equipment on a second carrier frequency.

It should be noted that when the at least two carrier signals are sent to different base stations, for example, the at least two carrier signals include a first carrier signal and a second carrier signal, the first carrier signal is corresponding to the primary base station, and the second carrier signal is corresponding to the secondary base station, the method further includes: sending, by the primary base station as a primary serving cell to the secondary base station through an interface between the base stations, a request of adding a secondary serving cell for the user equipment; responding, by the secondary base station, to the request of the primary base station, and agreeing to provide transmission of a secondary carrier signal to the user equipment; randomly accessing, by the user equipment, the secondary serving cell, determining a reference signal according to network configuration, and sending the reference signal to the primary base station and the secondary base station; separately obtaining, by the primary base station by means of calculation according to the reference signal, a first path loss G1 from the user equipment to the primary base station and an interference power spectrum I_psd_1 of the user equipment on a first carrier frequency; and separately obtaining, by the secondary base station by means of calculation according to the reference signal, a second path loss G2 from the user equipment to the secondary base station and an interference power spectrum I_psd_2 of the user equipment on a second carrier frequency.

Optionally, in 120, the user equipment determines, according to a bit error ratio, a path loss from the user equipment to the base station, and an interference power spectrum that are corresponding to each carrier signal of the at least two carrier signals, the channel gain reference quantity corresponding to each carrier signal. Specifically, the channel gain reference quantity may be directly proportional to the path loss, and be inversely proportional to the interference power spectrum and the bit error ratio. For example, the user equipment may determine a first channel gain reference quantity according to the following formula:

$$\alpha 1 = G1/(I\_psd\_1 * \gamma 1)$$

where $\alpha 1$ is the first channel gain reference quantity, and $\gamma 1$ is a first bit error ratio that meets transmission of the first carrier signal.

The user equipment determines a second channel gain reference quantity according to the following formula:

$$\alpha 2 = G2/(I\_psd\_2 * \gamma 2)$$

where $\alpha 2$ is the second channel gain reference quantity, and $\gamma 2$ is a second bit error ratio that meets transmission of the second carrier signal.

It should be noted that the foregoing method for calculating a channel gain reference quantity is used to help a person skilled in the art better understand the embodiments of the present invention instead of limiting the scope of the embodiments of the present invention. Apparently, a person skilled in the art may perform various equivalent modification or variation according to the foregoing given description and calculation manner, and such modification or variation also falls within the scope of the embodiments of present invention.

Optionally, in 130, a comparison is first made between a magnitude of the channel gain reference quantity of the first carrier signal and a magnitude of the channel gain reference quantity of the second carrier signal, and then, the power of the first carrier signal and the power of the second carrier signal are controlled according to a comparison result, which specifically falls into the following three cases:

In a first case, it is determined that the first channel gain reference quantity is less than the second channel gain reference quantity; the power of the first carrier signal is determined according to the following formula:

$$P1 = P1\_min = P_{01} * (1 - \gamma 1)/G1$$

where P1 is the power of the first carrier signal, P1_min is a power corresponding to a minimum bit error ratio that meets transmission of the first carrier signal, and $P_{01}$ is an expected power of the first carrier signal; and the power of the second carrier signal is determined according to the following formula:

$$P2 = P\_ue\_max - P1\_min$$

where P2 is the power of the second carrier signal, and P_ue_max is the maximum transmit power supported by the user equipment.

In a second case, it is determined that the second channel gain is less than the first channel gain; the power of the second carrier signal is determined according to the following formula:

$$P2 = P_{02} * (1 - \gamma 2)/G2$$

where $P_{02}$ is an expected power value of the second carrier signal; and the power of the first carrier signal is determined according to the following formula:

$$P1 = P\_ue\_max - P2\_min$$

where P1 is the power of the first carrier signal, and P_ue_max is the maximum transmit power supported by the user equipment.

In a third case, it is determined that the first channel gain reference quantity is equal to the second channel gain reference quantity; and the power of the first carrier signal and the power of the second carrier signal are determined according to the following formula:

$$P1 = P2 = P\_ue\_max/2$$

where P1 is the power of the first carrier signal, P2 is the power of the second carrier signal, and P_ue_max is the maximum transmit power supported by the user equipment.

The following describes the embodiments of the present invention in further details with reference to a specific example. It should be noted that the example of FIG. 1 is merely used to help a person skilled in the art better understand the embodiments of the present invention instead of limiting the embodiments of the present invention to specific values or specific scenarios that are shown in the example. Apparently, a person skilled in the art may perform various equivalent modification or variation according to the given example of FIG. 1, and such modification or variation also falls within the scope of the embodiments of present invention.

Figure 2:
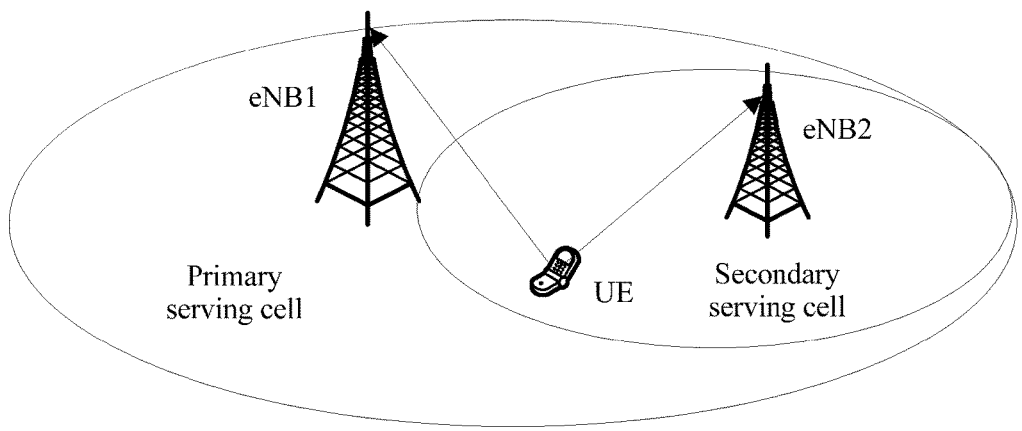
FIG. 2 is a schematic diagram of a communications network scenario that may be applied to an embodiment of the present invention.

The following describes a method in this embodiment of the present invention with reference to a specific example of a scenario in FIG. 2. FIG. 2 is a scenario diagram of a specific example of FIG. 1. Referring to FIG. 2, FIG. 2 is a schematic diagram of a scenario of a method for controlling power of a carrier signal according to an embodiment the present invention. As shown in FIG. 2, in an aggregation scenario of carriers in two standards, there are two base stations (an eNB1 and an eNB2) on a network, and there is a direct connection interface X2 between the eNB1 and the eNB2. A base station 1 (the eNB1) currently provides a radio service for user equipment (UE), and is a base station of a primary serving cell (a primary base station). A working carrier frequency is F1, and a radio transmission standard in which the base station 1 works is an LTE E-UTRA FDD standard. The UE is also in coverage of a base station 2 (the eNB2). The base station 2 is a base station of a secondary serving cell (a secondary base station). A working carrier frequency is F2, and a radio transmission standard in which the base station 2 works is an LTE E-UTRA TDD standard.

It should be noted that FIG. 2 shows merely an aggregation scenario of two carriers in two standards, which is not limited in this embodiment of the present invention. For example, there may be further an aggregation scenario of two carrier signals or multiple carrier signals in a same standard, or an aggregation scenario of multiple carrier signals in multiple standards.

Figure 3:
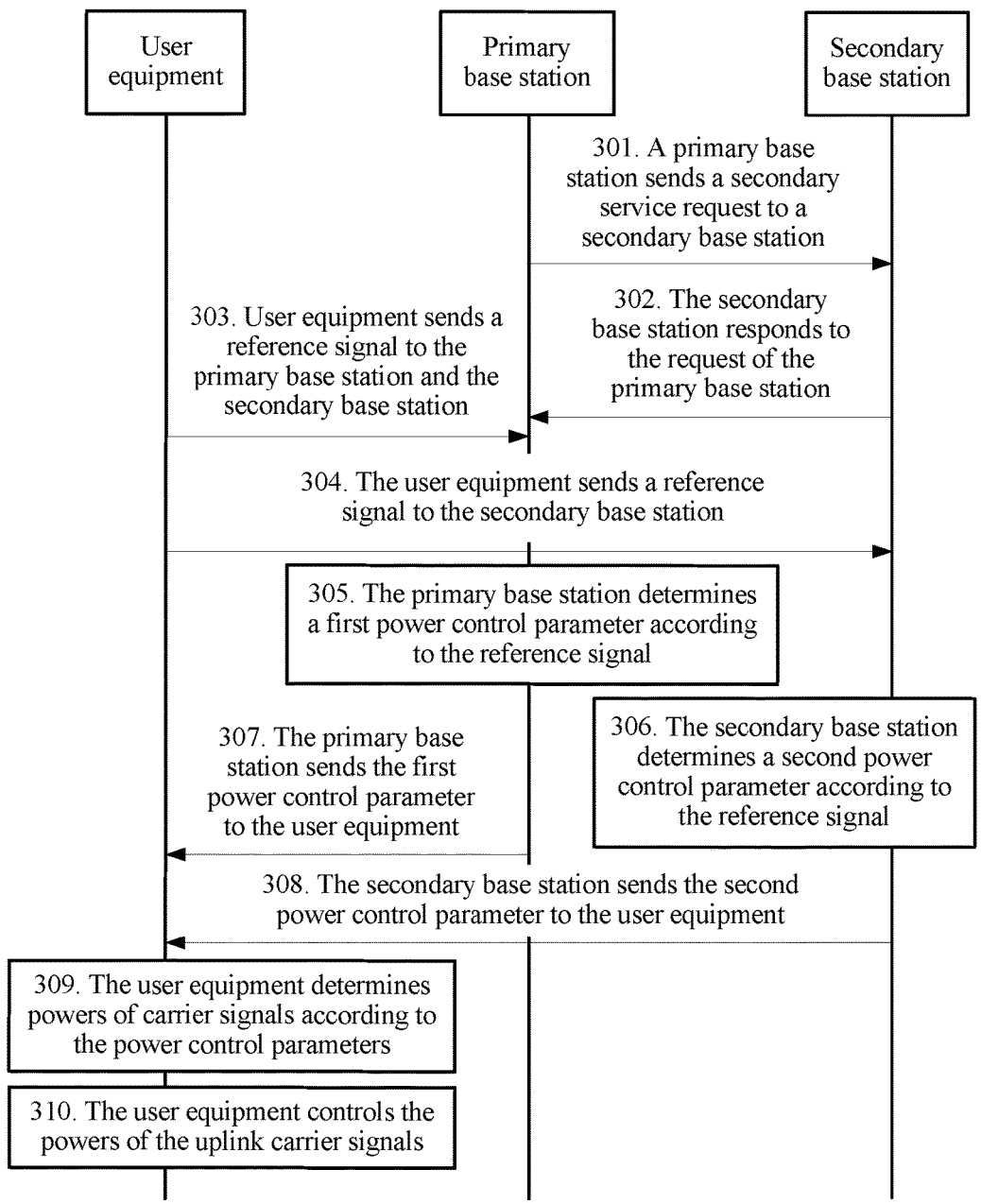
FIG. 3 is a schematic flowchart of a method for controlling power of a carrier signal according to another embodiment of the present invention.

Specifically, a method in this embodiment of the present invention is described according to the scenario shown in FIG. 2 with reference to a specific example in FIG. 3. FIG. 3 is a schematic flowchart of a method for controlling power of a carrier signal according to another embodiment of the present invention. Specifically, as shown in FIG. 3, the method includes:

301. A primary base station sends a secondary service request to a secondary base station.

Specifically, an eNB1 as a primary serving cell sends, to an eNB2 through an X2 interface between the base stations, a request of adding a secondary serving cell for user equipment UE.

302. The secondary base station responds to the request of the primary base station.

Specifically, the eNB2 sends, to the eNB1, a message as a response to the request of adding a secondary serving cell to indicate that the eNB2 agrees to provide transmission of a secondary carrier for the UE.

303. User equipment sends a reference signal to the primary base station.

Specifically, an uplink reference signal SRS (Sounding Reference Signal) is determined according to configuration information, and the reference signal is sent to the primary base station.

Further, if a channel of the reference signal is a physical uplink shared channel PUSCH, a power of the reference signal may be determined according to the following formula:

$$P_{SRS,c}(i) = \min \left\{ \begin{array}{l} P_{CMAX,c}(i) \\ P_{SRS\_OFFEST,c}(m) + 10\log_{10}(M_{SRS,c}) + \\ P_{0\_pusch,c}(j) + \alpha_c(j) * PL_c + f_c(i) \end{array} \right\}$$

where c is a serving cell identity; i is a subframe number; a value of j is related to a scheduling manner on a base station side, for example, j may be 1; a value of m is related to a type of the reference signal, for example, m may be 0 or 1; $P_{SRS,c(i)}$ is a transmit power of the reference signal; $P_{CMAX,c}(i)$ is a maximum transmit power supported by the UE; $P_{SRS\_OFFEST,c}(m)$ is an offset power of the uplink reference signal; $M_{SRS,c}$ is a quantity of physical resource blocks allocated by the base station; $P_{0\_pusch,c}(j)$ is an expected power value of the reference signal; $\alpha_c(j)$ is a path loss adjustment parameter; $f_c(i)$ is a power step; and $PL_c$ is a downlink path loss, from the base station to the user equipment, calculated by the user equipment.

304. The user equipment sends a reference signal to the secondary base station.

Specifically, the UE randomly accesses the secondary serving cell, and sends, to the secondary base station, a reference signal determined according to configuration information.

Further, if a channel of the reference signal is a physical uplink shared channel PUSCH, a power of the reference signal may be determined according to the following formula:

$$P_{SRS,c}(i) = \min \left\{ \begin{array}{l} P_{CMAX,c}(i) \\ P_{SRS\_OFFEST,c}(m) + 10\log_{10}(M_{SRS,c}) + \\ P_{0\_pusch,c}(j) + \alpha_c(j) * PL_c + f_c(i) \end{array} \right\}$$

where c is a serving cell identity; i is a subframe number; a value of j is related to a scheduling manner on a base station side, for example, j may be 1; a value of m is related to a type of the reference signal, for example, m may be 0 or 1; $P_{SRS,c(i)}$ is a transmit power of the reference signal; $P_{CMAX,c}(i)$ is a maximum transmit power supported by the UE; $P_{SRS\_OFFEST,c}(m)$ is an offset power of the uplink reference signal; $M_{SRS,c}$ is a quantity of physical resource blocks allocated by the base station; $P_{0\_pusch,c}(j)$ is an expected power value of the reference signal; $\alpha_c(j)$ is a path loss adjustment parameter; $f_c(i)$ is a power step; and $PL_c$ is a downlink path loss, from the base station to the user equipment, calculated by the user equipment.

It should be noted that the SRS in step 303 and that in step 304 belong to a same type of reference signals, and basic features of the signals are the same. Configuration parameters of the SRS, for example, transmission bandwidth of the SRS and a transmission period of the SRS, may be different for a primary carrier signal and a secondary carrier signal, which is not limited in this embodiment of the present invention. It should be further noted that an execution sequence of steps 303 and 304 is not limited in this embodiment of the present invention. For example, 303 may be executed before 304; or 304 may be executed before 303; or 303 and 304 may be simultaneously executed.

305. The primary base station determines a first power control parameter according to the reference signal.

Specifically, the eNB1 estimates an uplink path loss from the UE to the eNB1 and an uplink interference power spectrum of the UE according to the uplink reference signal of the UE. For example, the uplink path loss, from the UE to the eNB1, estimated by a primary base station side is G1, and the uplink interference power spectrum of the UE on a carrier frequency F1 is I_psd_1.

306. The secondary base station determines a second power control parameter according to the reference signal.

Specifically, the eNB2 estimates an uplink path loss from the UE to the eNB2 and an uplink interference power spectrum of the UE according to the uplink reference signal of the UE. For example, the uplink path loss, from the UE to the eNB2, estimated by the secondary base station is G2, and the uplink interference power spectrum of the UE on a carrier frequency F2 is I_psd_2.

307. The primary base station sends the first power control parameter to the user equipment.

Specifically, the eNB1 directly delivers G1 and I_psd_1 to the UE.

308. The secondary base station sends the second power control parameter to the user equipment.

Specifically, the eNB2 directly delivers G2 and I_psd_2 to the UE.

It should be noted that step 307 and step 308 provide a manner in which a base station delivers a power control parameter, and the base station may deliver the power control parameter in another manner, which is not limited in this embodiment of the present invention. For example, alternatively, the following manner may be used: The eNB2 (the secondary serving cell) sends G2 and I_psd_2 to the eNB1 (the primary serving cell) through an X2 interface, and then, the eNB1 (the primary serving cell) delivers the four parameters of G1, I_psd_1, G2, and I_psd_2 to the user equipment.

309. The user equipment determines power of carrier signals according to power control parameters.

Specifically, a UE side calculates and estimates uplink transmit power of the eNB1 and the eNB2 according to parameters delivered through a network. For example, a channel of a first carrier signal and that of a second carrier signal are a physical uplink shared channel PUSCH, and two power may be calculated according to the following formulas:

$$P_{PUSCH,c}(i)_1 = \min\begin{Bmatrix} P_{CMAX,c}(i) \\ 10\log_{10}(M_{PUSCH,c}(i)_1) + P_{0\_pusch,c}(j)_1 + \\ \alpha_c(j)_1 * PL_{c1} + \Delta_{TF,c}(i)_1 + f_c(i)_1 \end{Bmatrix}$$

$$P_{PUSCH,c}(i)_2 = \min\begin{Bmatrix} P_{CMAX,c}(i) \\ 10\log_{10}(M_{PUSCH,c}(i)_2) + P_{0\_pusch,c}(j)_2 + \\ \alpha_c(j)_2 * PL_{c2} + \Delta_{TF,c}(i)_2 + f_c(i)_2 \end{Bmatrix}$$

where c is a serving cell identity; i is a subframe number; a value of j may be 0, 1, or 2, and a value of j depends on a scheduling manner on a base station side, for example, if the base station uses semi-persistent scheduling, j=0, in a case in which the base station uses dynamic scheduling, j=1, and in a manner similar to random access, j=2; $P_{PUSCH,c}(i)_1$ is a transmit power of the first carrier signal; $P_{CMAX,c}(i)$ is the maximum transmit power supported by the UE; $M_{PUSCH,c}(i)_1$ is a quantity of physical resource blocks allocated by the base station for the first carrier signal; $P_{0\_pusch,c}(j)_1$ is an expected power of the first carrier signal; $\alpha_c(j)_1$ is a first path loss adjustment parameter; $\Delta_{TF,c}(i)_1$ is a network configuration parameter; $f_c(i)_1$ is a power control adjustment step of the first carrier signal; $PL_{c1}$ is a downlink path loss, from the primary base station to the user equipment, calculated by the user equipment; $P_{PUSCH,c}(i)_2$ is a transmit power of the second carrier signal; $M_{PUSCH,c}(i)_2$ is a quantity of physical resource blocks allocated by the base station for the second carrier signal; $P_{0\_pusch,c}(j)_2$ is an expected power of the second carrier signal; $\alpha_c(j)_2$ is a second path loss adjustment parameter; $\Delta_{TF,c}(i)_2$ is a network configuration parameter; $f_c(i)_2$ is a power control adjustment step of the second carrier signal; and $PL_{c2}$ is a downlink path loss, from the secondary base station to the user equipment, calculated by the user equipment.

First, the user equipment determines that a sum of $P_{PUSCH,c}(i)_1$ and $P_{PUSCH,c}(i)_2$ is greater than the maximum transmit power supported by the user equipment.

Then, the UE may first estimate an uplink transmission rate of the UE, which should be:

$R=R1+R2=(P_{PUSCH,c}(i)_1*G1)/(I\_psd\_1*\gamma 1)+(P_{PUSCH,c}(i)_2*G2)/(I\_psd\_2*\gamma 2)$ where R is the uplink transmission rate of the user equipment, R1 is an uplink transmission rate of the first carrier, and R2 is an uplink transmission rate of the first carrier.

It should be understood that $\gamma 1$ and $\gamma 2$ are minimum bit error ratios that need to be achieved to meet transmission of different services. In a case of carrier signal aggregation, if the first carrier signal and the second carrier signal are used to transmit a same type of services, $\gamma 1=\gamma 2$; and if the first carrier signal and the second carrier signal are used to transmit different types of services, $\gamma 1$ is not equal to $\gamma 2$.

It is assumed that $\alpha 1=G1/(I\_psd\_1*\gamma 1)$, and $\alpha 2=G2/(I\_psd\_2*\gamma 2)$, where $\alpha 1$ is a first channel gain reference quantity corresponding to the first carrier signal, and $\alpha 2$ is a second channel gain reference quantity corresponding to the second carrier signal. The UE performs the following determining:

If $\alpha 1 > \alpha 2$, it indicates that a channel gain of the UE in the primary serving cell is larger. Therefore, a power of the UE is allocated on F1 as much as possible, and a power allocated on F2 only needs to meet a minimum power of service transmission, that is, $P2=P2\_min, P1=P\_ue\_max-P2\_min$, and $P2=P2\_min=P_{02}*(1-\gamma 2)/G2$, where P2 is the power of the second carrier signal, P2_min is a power corresponding to a minimum bit error ratio that meets transmission of the second carrier signal, $P_{O0}$ is an expected power value of the second carrier signal, P_ue_max is the maximum transmit power supported by the user equipment, and P1 is the power of the first carrier signal.

If $\alpha 1 < \alpha 2$, it indicates that a channel gain of the UE in the secondary serving cell is larger. Therefore, a power of the UE is allocated on F2 as much as possible, and a power allocated on F1 only needs to meet a minimum power of service transmission, that is, $P1=P\_min, P2=P\_ue\_max-P1\_min$, and $P1=P1\_min=P_{01}*(1-\gamma 1)/G1$, where P1 is the power of the first carrier signal, P1_min is a power corresponding to a minimum bit error ratio that meets transmission of the first carrier signal, $P_{O1}$ is an expected power of the first carrier signal, P2 is the power of the second carrier signal, and P_ue_max is the maximum transmit power supported by the user equipment.

If $\alpha 1 = \alpha 2$, an uplink power is evenly allocated, that is, $P1=P2=P\_ue\_max/2$ where P1 is the power of the first carrier signal, P2 is the power of the second carrier signal, and P_ue_max is the maximum transmit power supported by the user equipment.

According to the foregoing calculation, the uplink transmission rate R of the user equipment can be effectively enhanced, and network performance can be improved.

310. The user equipment controls the power of the uplink carrier signals.

Specifically, the user equipment performs corresponding uplink power allocation according to a calculation result in step 306.

Therefore, according to this embodiment of the present invention, user equipment may receive a power control parameter sent by a base station, determine a channel gain reference quantity according to the power control parameter, further determine a magnitude of a channel gain, and then, control a power of a carrier signal according to the magnitude of the channel gain, so as to effectively utilize a power resource of the user equipment and improve network performance.

It should be noted that a sum P1+P2 (P_ue_max) of the power of the first carrier signal and the power of the second carrier signal in the embodiment of FIG. 3 is the maximum transmit power supported by the user equipment. In actual application, according to an actual requirement, a value of P_ue_max may be less than or equal to the maximum transmit power supported by the user equipment, for example, be ½, ⅔, or ¾ of the maximum transmit power supported by the user equipment.

It should be understood that sequence numbers in the foregoing processes do not indicate execution sequences, and the execution sequences of the processes should be determined according to functions and internal logic of the processes, which should not constitute any limitation on implementation processes of this embodiment of the present invention.

The embodiment of FIG. 3 shows merely a scenario in which a channel of an uplink carrier signal is a physical uplink shared channel PUSCH. The channel of the uplink carrier signal in this embodiment of the present invention may be further in another form, for example, a physical uplink control channel PUCCH. Different carrier signals in this embodiment of the present invention may be further transmitted through channels in a same type, or transmitted through channels in different types, which is not limited in this embodiment of the present invention.

It should be further noted that FIG. 3 shows merely a scenario of aggregation of two carrier signals. For a scenario of aggregation of three carrier signals or multiple carrier signals, the method in this embodiment of the present invention may also be used, which is not limited in this embodiment of the present invention. For example, for a scenario of aggregation of three carrier signals, in this embodiment of the present invention, magnitudes of three channel gains may be determined, carrier signals corresponding to two relatively small channel gains may be determined, and minimum power that meet service transmission are determined as power corresponding to the two carrier signals. Subtraction is performed between a maximum transmit power supported by user equipment and the power of the carrier signals corresponding to the two channel gains, and a difference is determined as a power corresponding to the carrier signal with a larger channel gain. For a scenario of multiple carrier signals, power of the aggregation carrier signals are controlled by using a method similar to the foregoing method.

The foregoing describes in detail the method for controlling power of a carrier signal according to the embodiments of the present invention from a perspective of user equipment with reference to FIG. 1 to FIG. 3. The following describes in detail a method for controlling power of a carrier signal according to an embodiment of the present invention from a perspective of a base station with reference to FIG. 4.

Figure 4:
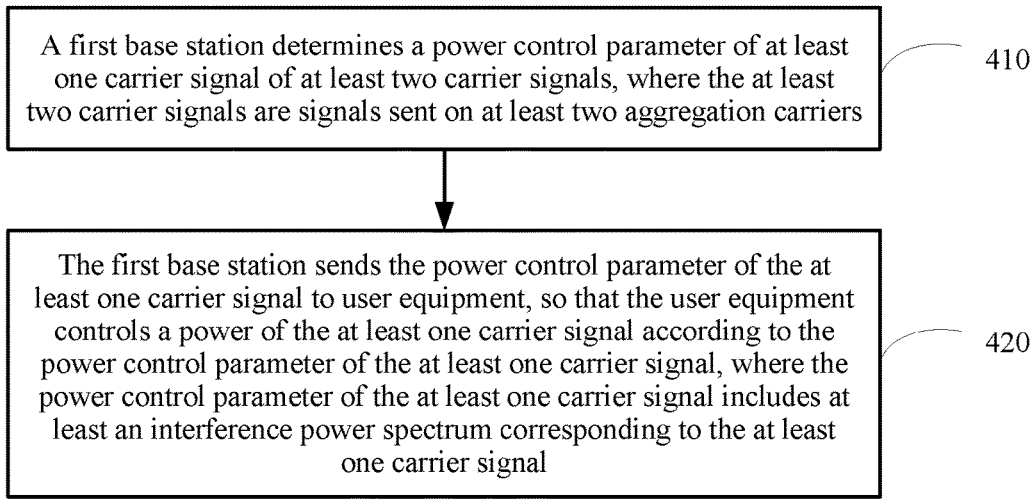
FIG. 4 is a schematic flowchart of a method for controlling power of a carrier signal according to another embodiment of the present invention.

FIG. 4 is a schematic flowchart of a method for controlling power of a carrier signal according to another embodiment of the present invention. The method is executed by a first base station. It should be understood that interaction, related features, functions, and the like that are of controlling power of a carrier signal and described on a first base station side are corresponding to descriptions on a user equipment side. For brevity, repeated descriptions are properly omitted. As shown in FIG. 4, the method includes:

410. The first base station determines a power control parameter of at least one carrier signal of at least two carrier signals, where the at least two carrier signals are signals sent on at least two aggregation carriers.

420. The first base station sends the power control parameter of the at least one carrier signal to user equipment, so that the user equipment controls a power of the at least one carrier signal according to the power control parameter of the at least one carrier signal, where the power control parameter of the at least one carrier signal includes at least an interference power spectrum corresponding to the at least one carrier signal.

It should be understood that in 410, the first base station may determine power control parameters of one or more carrier signals of the at least two carrier signals. In a case, the first base station may determine power control parameters of one or more carrier signals of the at least two carrier signals, and send the power control parameters to the user equipment, so that the user equipment controls the power of the at least one carrier signal of the at least two carrier signals according to the power control parameters.

Optionally, in another embodiment, in 410, the power control parameter of the at least one carrier signal may include a power control parameter of a carrier signal, for example, a power control parameter of a first carrier signal. In 420, the first base station sends the power control parameter of the first carrier signal to the user equipment, so that the user equipment controls a power of the first carrier signal according to the power control parameter of the first carrier signal.

Alternatively, in another embodiment, the at least two carrier signals include a first carrier signal and a second carrier signal, and the power control parameter of the at least one carrier signal includes a power control parameter of the first carrier signal and a power control parameter of the second carrier signal. In 410, when the first base station is a multimode base station, the first base station may determine the power control parameter of the first carrier signal and the power control parameter of the second carrier signal. Alternatively, in 410, the first base station may determine only the power control parameter of the first carrier signal, and the first base station receives the power control parameter, sent by a second base station, of the second carrier signal. In 420, the first base station sends the power control parameter of the first carrier signal and the power control parameter of the second carrier signal to the user equipment, so that the user equipment controls a power of the first carrier signal and a power of the second carrier signal according to the power control parameter of the first carrier signal and the power control parameter of the second carrier signal.

Therefore, according to this embodiment of the present invention, user equipment may receive a power control parameter sent by a base station, and the user equipment determines a magnitude of a channel gain according to the power control parameter, and further controls a power of a carrier signal according to the power control parameter and the magnitude of the channel gain, so as to effectively utilize a power resource of the user equipment and improve network performance.

Figure 5:
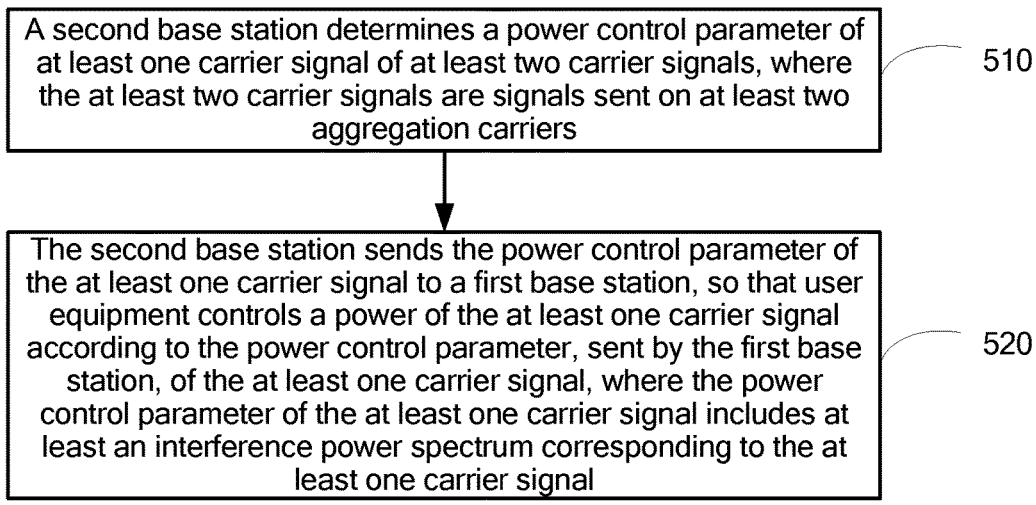
FIG. 5 is a schematic flowchart of a method for controlling power of a carrier signal according to another embodiment of the present invention.

FIG. 5 is a schematic flowchart of a method for controlling power of a carrier signal according to another embodiment of the present invention. The method is executed by a second base station. It should be understood that interaction, related features, functions, and the like that are of controlling power of a carrier signal and described on a second base station side are corresponding to descriptions on a user equipment side. For brevity, repeated descriptions are properly omitted. As shown in FIG. 5, the method includes:

510. The second base station determines a power control parameter of at least one carrier signal of at least two carrier signals, where the at least two carrier signals are signals sent on at least two aggregation carriers.

520. The second base station sends the power control parameter of the at least one carrier signal to a first base station, so that user equipment controls a power of the at least one carrier signal according to the power control parameter, sent by the first base station, of the at least one carrier signal, where the power control parameter of the at least one carrier signal includes at least an interference power spectrum corresponding to the at least one carrier signal.

Specifically, the second base station may determine power control parameters of one or more carrier signals of the at least two carrier signals. In a case, the second base station may determine a power control parameter of a carrier signal of the at least two carrier signals, and send the power control parameter of the carrier signal of the at least two carrier signals to the first base station, so that the user equipment controls the power of the at least one carrier signal according to the power control parameter, sent by the first base station, of the at least one carrier signal. In another case, the second base station may determine power control parameters of multiple carrier signals of the at least two carrier signals. Specifically, the second base station may determine a power control parameter of a carrier signal of the at least two carrier signals, and may receive a power control parameter, determined by a third base station, of at least one carrier signal, and then, the second base station sends the power control parameters of the multiple carrier signals of the at least two carrier signals to the first base station, so that the user equipment controls power of the at least two carrier signals according to the power control parameters that are sent by the first base station and that are of the multiple carrier signals of the at least two carrier signals. The first base station receives the power control parameters of the multiple carrier signals, and sends the power control parameters to the user equipment, so that the user equipment controls the power of the at least one carrier signal of at least two carrier signals according to the power control parameters.

Therefore, according to this embodiment of the present invention, user equipment may receive a power control parameter sent by a base station, and the user equipment determines a magnitude of a channel gain according to the power control parameter, and further controls a power of a carrier signal according to the power control parameter and the magnitude of the channel gain, so as to effectively utilize a power resource of the user equipment and improve network performance.

The foregoing describes in detail the method for controlling power of a carrier signal according to the embodiments of the present invention from a perspective of user equipment with reference to FIG. 1 to FIG. 3, and describes the method for controlling power of a carrier signal according to the embodiments of the present invention from a perspective of a base station with reference to FIG. 4 and FIG. 5. The following describes in detail user equipment according to the embodiments of the present invention with reference to FIG. 6 to FIG. 8, and describes in detail a base station according to the embodiments of the present invention with reference to FIG. 9 to FIG. 12.

Figure 6:
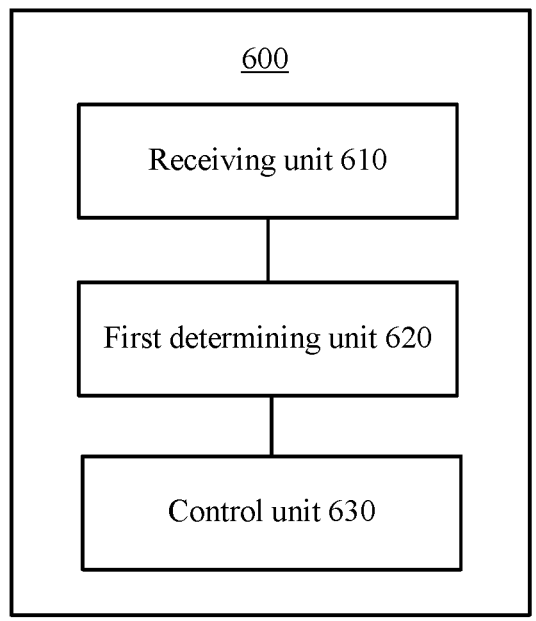
FIG. 6 is a schematic block diagram of user equipment according to an embodiment of the present invention.

FIG. 6 is a schematic block diagram of user equipment according to an embodiment of the present invention. The user equipment 600 shown in FIG. 6 includes: a receiving unit 610, a first determining unit 620, and a control unit 630.

Specifically, the receiving unit 610 is configured to receive power control parameters, sent by at least one base station, of at least two carrier signals, where the at least two carrier signals are signals sent on at least two aggregation carriers. The first determining unit 620 is configured to determine, according to the power control parameters, channel gain reference quantities corresponding to the at least two carrier signals, where the channel gain reference quantities are used to represent a magnitude of a channel gain. The control unit 630 is configured to control power of the at least two carrier signals according to the channel gain reference quantities.

Therefore, according to this embodiment of the present invention, user equipment may receive a power control parameter sent by a base station, determine a channel gain reference quantity according to the power control parameter, further determine a magnitude of a channel gain, and then, control a power of a carrier signal according to the magnitude of the channel gain, so as to effectively utilize a power resource of the user equipment and improve network performance.

It should be understood that the aggregation carrier in this embodiment of the present invention may be a carrier in intra-RAT carrier aggregation in a same standard, or a carrier in multi-RAT CA, that is, carrier aggregation in multiple standards (also referred to as inter-RAT CA "inter-RAT carrier aggregation"), which is not limited in this embodiment of the present invention. In other words, the at least one base station in this embodiment of the present invention may include a primary base station, or include a primary base station and at least one secondary base station. The at least two carrier signals in this embodiment of the present invention may be carrier signals in a same standard or carrier signals in at least two standards. Specifically, when the at least one base station includes a primary base station, the power control parameters of the at least two carrier signals may include power control parameters of carrier signals in a same standard; and when the primary base station is a multimode base station, the power control parameters of the at least two carrier signals may further include power control parameters of multiple carrier signals in different standards. When the at least one base station includes a primary base station and at least one secondary base station, the power control parameters of the at least two carrier signals may include power control parameters of carrier signals in a same standard, or include power control parameters of multiple carrier signals in different standards, which is not limited in this embodiment of the present invention.

Optionally, in another embodiment, the control unit 630 determines a carrier signal corresponding to a minimum channel gain reference quantity, and determines a power corresponding to a minimum bit error ratio that meets transmission of the carrier signal as a power of the carrier signal.

Optionally, in another embodiment, the at least one base station includes a primary base station, and the at least two carrier signals include a first carrier signal and a second carrier signal. The receiving unit 610 receives a power control parameter of the first carrier signal and a power control parameter of the second carrier signal that are sent by the primary base station, where the power control parameter of the first carrier signal and the power control parameter of the second carrier signal are determined by the primary base station, or the power control parameter of the first carrier signal is determined by the primary base station, and the power control parameter of the second carrier signal is determined by a secondary base station and is sent to the primary base station.

Optionally, in another embodiment, the at least one base station includes a primary base station and a secondary base station, and the at least two carrier signals include a first carrier signal and a second carrier signal. The receiving unit 610 receives a power control parameter, sent by the primary base station, of the first carrier signal, and receives a power control parameter, sent by the secondary base station, of the second carrier signal.

Optionally, in another embodiment, the channel gain reference quantities corresponding to the at least two carrier signals include a first channel gain reference quantity corresponding to the first carrier signal and a second channel gain reference quantity corresponding to the second carrier signal. The power control parameters include I_psd_1, G1, I_psd_2, and G2, where G1 is a first path loss from the user equipment to the base station, I_psd_1 is an interference power spectrum of the user equipment on a first carrier frequency, G2 is a second path loss from the user equipment to the base station, and I_psd_2 is an interference power spectrum of the user equipment on a second carrier frequency. The first determining unit 520 determines the first channel gain reference quantity according to the following formula: $\alpha 1 = G1/(I\_psd\_*\gamma 1)$, where $\alpha 1$ is the first channel gain reference quantity, and $\gamma 1$ is a first bit error ratio that meets transmission of the first carrier signal. The first determining unit 620 determines the second channel gain reference quantity according to the following formula: $\alpha 2 = G2/(I\_psd\_2*\gamma 2)$, where $\alpha 2$ is the second channel gain reference quantity, and $\gamma 2$ is a second bit error ratio that meets transmission of the second carrier signal.

Optionally, in another embodiment, the control unit 630 determines that the first channel gain is less than the second channel gain; determines a power of the first carrier signal according to the following formula:

$$P1 = P1\_min = P_{01}*(1-\gamma 1)/G1$$

where P1 is the power of the first carrier signal, P1_min is a power corresponding to a minimum bit error ratio that meets transmission of the first carrier signal, and $P_{01}$ is an expected power value of the first carrier signal; and determines a power of the second carrier signal according to the following formula:

$$P2 = P\_ue\_max - P1$$

where P2 is the power of the second carrier signal, and P_ue_max is a maximum transmit power supported by the user equipment.

Optionally, in another embodiment, the control unit 630 determines that the first channel gain reference quantity is equal to the second channel gain reference quantity, and determines a power of the first carrier signal and a power of the second carrier signal according to the following formula:

$$P1 = P2 = P\_ue\_max/2$$

where P1 is the power of the first carrier signal, P2 is the power of the second carrier signal, and P_ue_max is a maximum transmit power supported by the user equipment.

Optionally, in another embodiment, the at least two carrier signals are carrier signals of same radio access or carrier signals of different radio access.

Optionally, in another embodiment, the user equipment in this embodiment of the present invention may further include a second determining unit. Specifically, user equipment 700 shown in FIG. 7 includes a receiving unit 710, a first determining unit 720, a control unit 730, and a second determining unit 740.

Specifically, the second determining unit 740 is configured to determine that a sum of power of at least two carrier signals is greater than a maximum transmit power supported by the user equipment. A function of the receiving unit 710 is corresponding to that of the receiving unit 610, a function of the first determining unit 720 is corresponding to that of the first determining unit 620, and a function of the control unit 730 is corresponding to that of the control unit 630. To avoid repetition, details are not described herein again.

Therefore, according to this embodiment of the present invention, user equipment may receive a power control parameter sent by a base station, determine a channel gain reference quantity according to the power control parameter, further determine a magnitude of a channel gain, and then, control a power of a carrier signal according to the magnitude of the channel gain, so as to effectively utilize a power resource of the user equipment and improve network performance.

Figure 7:
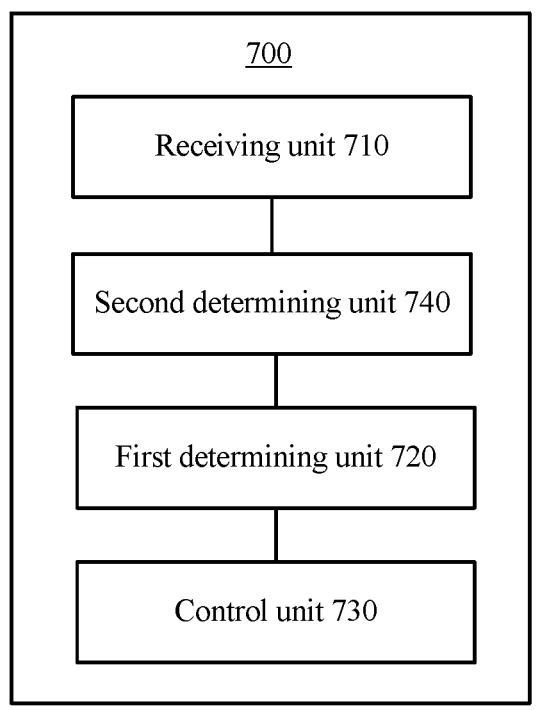
FIG. 7 is a schematic block diagram of user equipment according to another embodiment of the present invention.

It should be noted that the user equipment 600 shown in FIG. 6 and the user equipment 700 shown in FIG. 7 can implement corresponding processes implemented by the user equipment in the method embodiments of FIG. 1 to FIG. 5. For other functions and operations of the user equipment 600 and the user equipment 700, reference may be made to the processes related to the user equipment in the method embodiments of FIG. 1 to FIG. 5. To avoid repetition, details are not described herein again.

Figure 8:
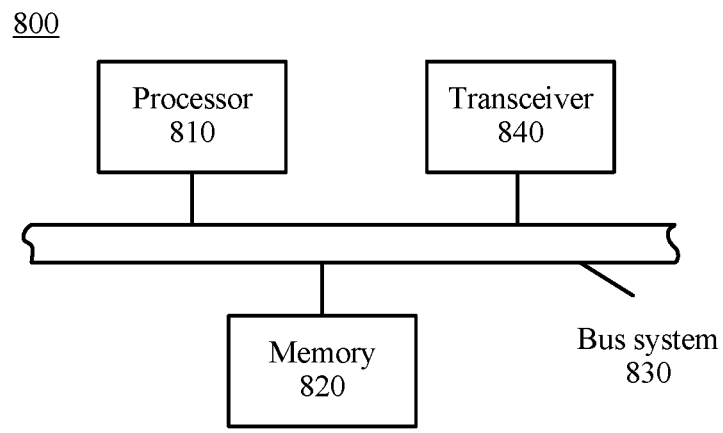
FIG. 8 is a schematic block diagram of user equipment according to another embodiment of the present invention.

FIG. 8 is a schematic block diagram of user equipment according to another embodiment of the present invention. The user equipment 800 shown in FIG. 8 includes: a processor 810, memory 820, a bus system 830, and a transceiver 840. The processor 810, the memory 820, and the transceiver 840 are connected to each other by using the bus system 830.

Specifically, the processor 810 is configured to invoke, by using the bus system 830, code stored in the memory 820. The transceiver 840 is configured to receive power control parameters, sent by at least one base station, of at least two carrier signals, where the at least two carrier signals are signals sent on at least two aggregation carriers. The processor 810 determines, according to the power control parameters, channel gain reference quantities corresponding to the at least two carrier signals, where the channel gain reference quantities are used to represent a magnitude of a channel gain; and controls power of the at least two carrier signals according to the channel gain reference quantities.

Therefore, according to this embodiment of the present invention, user equipment may receive a power control parameter sent by a base station, determine a channel gain reference quantity according to the power control parameter, further determine a magnitude of a channel gain, and then, control a power of a carrier signal according to the magnitude of the channel gain, so as to effectively utilize a power resource of the user equipment and improve network performance.

The methods disclosed in the foregoing embodiments of the present invention may be applied to the processor 810, or be implemented by the processor 810. The processor 810 may be an integrated circuit chip and has a signal processing capability. In an implementation process, steps of the foregoing methods may be implemented by using an integrated logic circuit of hardware in the processor 810 or instructions in a software form. The foregoing processor 810 may be a general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, or a discrete hardware component, and may implement or execute the methods, steps, and logical block diagrams disclosed in the embodiments of the present invention. The general purpose processor may be a microprocessor, or the processor may be any conventional processor or the like. The steps of the methods disclosed with reference to the embodiments of the present invention may be directly executed and completed by using a hardware decoding processor, or may be executed and completed by using a combination of hardware and software modules in a decoding processor. The software module may be located in a mature storage medium in the field, such as a random access memory (Random Access Memory, RAM), a flash memory, a read-only memory (Read-Only Memory, ROM), a programmable read-only memory, an electrically erasable programmable memory, or a register. The storage medium is located in the memory 820. The processor 810 reads information in the memory 820 and completes the steps in the foregoing methods in combination with hardware of the processor 810. In addition to a data bus, the bus system 830 may further include a power bus, a control bus, and a status signal bus. However, for clear description, various types of buses are marked as the bus system 830 in the figure.

It should be understood that the aggregation carrier in this embodiment of the present invention may be a carrier in intra-RAT carrier aggregation in a same standard, or a carrier in multi-RAT CA, that is, carrier aggregation in multiple standards (also referred to as inter-RAT CA "inter-RAT carrier signal aggregation"), which is not limited in this embodiment of the present invention. In other words, the at least one base station in this embodiment of the present invention may include a primary base station, or include a primary base station and at least one secondary base station. The at least two carrier signals in this embodiment of the present invention may be carrier signals in a same standard or carrier signals in at least two standards. Specifically, when the at least one base station includes a primary base station, the power control parameters of the at least two carrier signals may include power control parameters of carrier signals in a same standard; and when the primary base station is a multimode base station, the power control parameters of the at least two carrier signals may further include power control parameters of multiple carrier signals in different standards. When the at least one base station includes a primary base station and at least one secondary base station, the power control parameters of the at least two carrier signals may include power control parameters of carrier signals in a same standard, or include power control parameters of multiple carrier signals in different standards, which is not limited in this embodiment of the present invention.

Optionally, in another embodiment, the processor 810 is further configured to determine that a sum of the power of the at least two carrier signals is greater than a maximum transmit power supported by the user equipment.

Optionally, in another embodiment, the processor 810 determines a carrier signal corresponding to a minimum channel gain reference quantity, and determines a power corresponding to a minimum bit error ratio that meets transmission of the carrier signal as a power of the carrier signal.

Optionally, in another embodiment, the at least one base station includes a primary base station, and the at least two carrier signals include a first carrier signal and a second carrier signal. The transceiver 840 receives a power control parameter of the first carrier signal and a power control parameter of the second carrier signal that are sent by the primary base station, where the power control parameter of the first carrier signal and the power control parameter of the second carrier signal are determined by the primary base station, or the power control parameter of the first carrier signal is determined by the primary base station, and the power control parameter of the second carrier signal is determined by a secondary base station and is sent to the primary base station.

Optionally, in another embodiment, the at least one base station includes a primary base station and a secondary base station, and the at least two carrier signals include a first carrier signal and a second carrier signal. The transceiver 740 receives a power control parameter, sent by the primary base station, of the first carrier signal, and receives a power control parameter, sent by the secondary base station, of the second carrier signal.

Optionally, in another embodiment, the channel gain reference quantities corresponding to the at least two carrier signals include a first channel gain reference quantity corresponding to the first carrier signal and a second channel gain reference quantity corresponding to the second carrier signal. The power control parameters include I_psd_1, G1, I_psd_2, and G2, where G1 is a first path loss from the user equipment to the base station, I_psd_1 is an interference power spectrum of the user equipment on a first carrier frequency, G2 is a second path loss from the user equipment to the base station, and I_psd_2 is an interference power spectrum of the user equipment on a second carrier frequency. The processor 810 determines the first channel gain reference quantity according to the following formula: $\alpha 1 = G1/(I\_psd\_1 * \gamma 1)$, where $\alpha 1$ is the first channel gain reference quantity, and $\gamma 1$ is a first bit error ratio that meets transmission of the first carrier signal. The processor 810 determines the second channel gain reference quantity according to the following formula: $\alpha 2 = G2/(I\_psd\_2 * \gamma 2)$, where $\alpha 2$ is the second channel gain reference quantity, and $\gamma 2$ is a second bit error ratio that meets transmission of the second carrier signal.

Optionally, in another embodiment, the processor 810 determines that the first channel gain is less than the second channel gain; determines a power of the first carrier signal according to the following formula:

$$P1 = P1\_\min = P_{01} * (1 - \gamma 1)/G1$$

where P1 is the power of the first carrier signal, P1_min is a power corresponding to a minimum bit error ratio that meets transmission of the first carrier signal, and $P_{01}$ is an expected power value of the first carrier signal; and determines a power of the second carrier signal according to the following formula:

$$P2 = P\_ue\_\max - P1$$

where P2 is the power of the second carrier signal, and P_ue_max is the maximum transmit power supported by the user equipment.

Optionally, in another embodiment, the processor 810 determines that the first channel gain reference quantity is equal to the second channel gain reference quantity, and determines a power of the first carrier signal and a power of the second carrier signal according to the following formula:

$$P1 = P2 = P\_ue\_\max/2$$

where P1 is the power of the first carrier signal, P2 is the power of the second carrier signal, and P_ue_max is the maximum transmit power supported by the user equipment.

Optionally, in another embodiment, the at least two carrier signals are carrier signals of same radio access or carrier signals of different radio access.

It should be noted that the user equipment 800 shown in FIG. 8 can implement corresponding processes implemented by the user equipment in the method embodiments of FIG.

1 to FIG. 5. For other functions and operations of the user equipment 800, reference may be made to the processes related to the user equipment in the method embodiments of FIG. 1 to FIG. 5. To avoid repetition, details are not described herein again.

Figure 9:
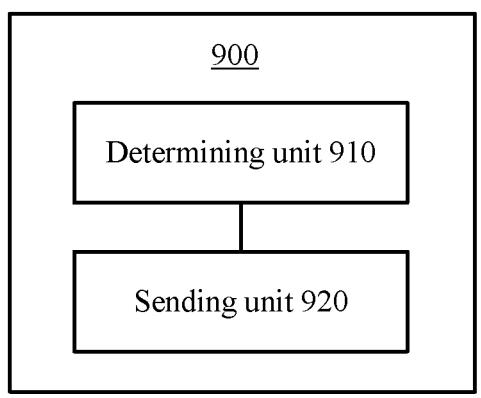
FIG. 9 is a schematic block diagram of a base station according to an embodiment of the present invention.

FIG. 9 is a schematic block diagram of a base station according to an embodiment of the present invention. The base station 900 shown in FIG. 9 includes: a determining unit 910 and a sending unit 920. Specifically, the determining unit 910 is configured to determine a power control parameter of at least one carrier signal of at least two carrier signals, where the at least two carrier signals are signals sent on at least two aggregation carriers. The sending unit 920 is configured to send the power control parameter of the at least one carrier signal to user equipment, so that the user equipment controls a power of the at least one carrier signal according to the power control parameter of the at least one carrier signal, where the power control parameter of the at least one carrier signal includes at least an interference power spectrum corresponding to the at least one carrier signal.

Therefore, according to this embodiment of the present invention, user equipment may receive a power control parameter sent by a base station, and the user equipment determines a magnitude of a channel gain according to the power control parameter, and further controls a power of a carrier signal according to the power control parameter and the magnitude of the channel gain, so as to effectively utilize a power resource of the user equipment and improve network performance.

It should be noted that the base station shown in FIG. 9 can implement processes implemented by the first base station in the method embodiments of FIG. 1 to FIG. 5. For other functions and operations of the base station 900, reference may be made to the processes related to the first base station in the method embodiments of FIG. 1 to FIG. 5. For example, the base station in FIG. 9 is corresponding to the method embodiment of FIG. 4, and for other functions and operations of the base station 900, reference may be made to processes related to the first base station in the method embodiment of FIG. 4. To avoid repetition, details are not described herein again.

Figure 10:
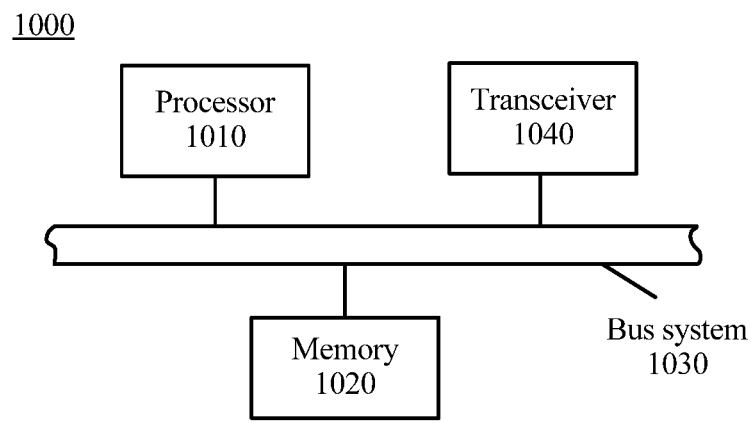
FIG. 10 is a schematic block diagram of a base station according to another embodiment of the present invention.

FIG. 10 is a schematic block diagram of a base station according to another embodiment of the present invention. The base station (a first base station) 1000 shown in FIG. 10 includes: a processor 1010, a memory 1020, a bus system 1030, and a transceiver 1040. The processor 1010, the memory 1020, and the transceiver 1040 are connected to each other by using the bus system 1030.

Specifically, the processor is configured to: invoke, by using the bus system 1030, code stored in the memory 1020, and determine a power control parameter of at least one carrier signal of at least two carrier signals, where the at least two carrier signals are signals sent on at least two aggregation carriers. The transceiver 1040 is configured to send the power control parameter of the at least one carrier signal to user equipment, so that the user equipment controls a power of the at least one carrier signal according to the power control parameter of the at least one carrier signal, where the power control parameter of the at least one carrier signal includes at least an interference power spectrum corresponding to the at least one carrier signal.

The methods disclosed in the foregoing embodiments of the present invention may be applied to the processor 1010, or be implemented by the processor 1010. The processor 1010 may be an integrated circuit chip and has a signal processing capability. In an implementation process, steps of the foregoing methods may be implemented by using an integrated logic circuit of hardware in the processor 1010 or instructions in a software form. The foregoing processor 1010 may be a general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, or a discrete hardware component, and may implement or execute the methods, steps, and logical block diagrams disclosed in the embodiments of the present invention. The general purpose processor may be a microprocessor, or the processor may be any conventional processor or the like. The steps of the methods disclosed with reference to the embodiments of the present invention may be directly executed and completed by using a hardware decoding processor, or may be executed and completed by using a combination of hardware and software modules in a decoding processor. The software module may be located in a mature storage medium in the field, such as a random access memory (Random Access Memory, RAM), a flash memory, a read-only memory (Read-Only Memory, ROM), a programmable read-only memory, an electrically erasable programmable memory, or a register. The storage medium is located in the memory 1020. The processor 1010 reads information in the memory 1020 and completes the steps in the foregoing methods in combination with hardware of the processor 1010. In addition to a data bus, the bus system 1030 may further include a power bus, a control bus, and a status signal bus. However, for clear description, various types of buses are marked as the bus system 1030 in the figure.

Therefore, according to this embodiment of the present invention, user equipment may receive a power control parameter sent by a base station, and the user equipment determines a magnitude of a channel gain according to the power control parameter, and further controls a power of a carrier signal according to the power control parameter and the magnitude of the channel gain, so as to effectively utilize a power resource of the user equipment and improve network performance.

It should be noted that the base station shown in FIG. 10 can implement processes implemented by the first base station in the method embodiments of FIG. 1 to FIG. 5. For other functions and operations of the base station 1000, reference may be made to the processes related to the first base station in the method embodiments of FIG. 1 to FIG. 5. For example, the base station of FIG. 10 is corresponding to the method embodiment of FIG. 4, and for other functions and operations of the base station 1000, reference may be made to processes related to the first base station in the method embodiment of FIG. 4. To avoid repetition, details are not described herein again.

Figure 11:
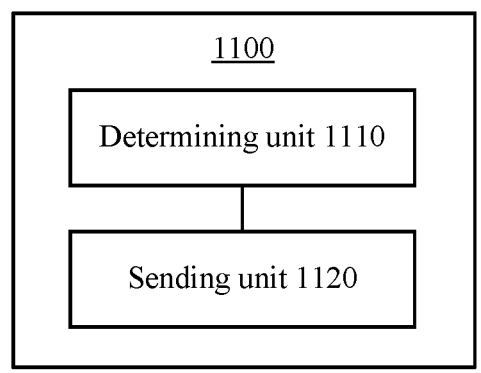
FIG. 11 is a schematic block diagram of a base station according to another embodiment of the present invention.

FIG. 11 is a schematic block diagram of a base station according to another embodiment of the present invention. The base station 1100 shown in FIG. 11 includes: a determining unit 1110 and a sending unit 1120. Specifically, the determining unit 1110 is configured to determine a power control parameter of at least one carrier signal of at least two carrier signals, where the at least two carrier signals are signals sent on at least two aggregation carriers. The sending unit 1120 is configured to send the power control parameter of the at least one carrier signal to a first base station, so that user equipment controls a power of the at least one carrier signal according to the power control parameter, sent by the first base station, of the at least one carrier signal, where the power control parameter of the at least one carrier signal includes at least an interference power spectrum corresponding to the at least one carrier signal.

Therefore, according to this embodiment of the present invention, user equipment may receive a power control parameter sent by a base station, and the user equipment determines a magnitude of a channel gain according to the power control parameter, and further controls a power of a carrier signal according to the power control parameter and the magnitude of the channel gain, so as to effectively utilize a power resource of the user equipment and improve network performance.

It should be noted that the base station shown in FIG. 11 can implement processes implemented by the second base station in the method embodiments of FIG. 1 to FIG. 5. For other functions and operations of the base station 1100, reference may be made to the processes related to the second base station in the method embodiments of FIG. 1 to FIG. 5. For example, the base station in FIG. 11 is corresponding to the method embodiment of FIG. 5, and for other functions and operations of the base station 1100, reference may be made to processes related to the second base station in the method embodiment of FIG. 4. To avoid repetition, details are not described herein again.

Figure 12:
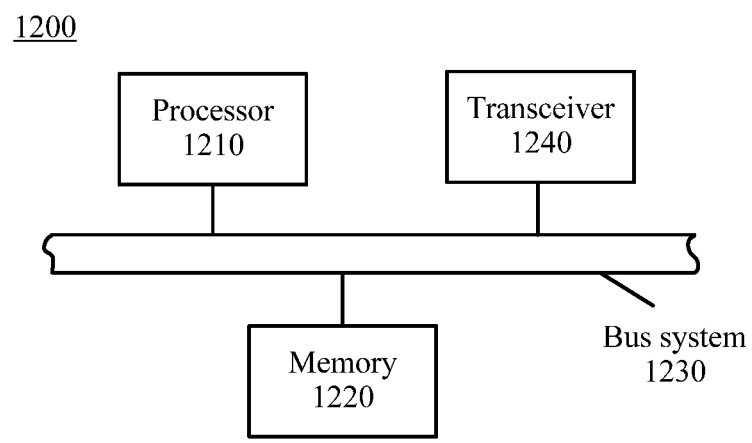
FIG. 12 is a schematic block diagram of a base station according to another embodiment of the present invention.

FIG. 12 is a schematic block diagram of a base station according to another embodiment of the present invention. The base station (a first base station) 1200 shown in FIG. 12 includes: a processor 1210, a memory 1220, a bus system 1230, and a transceiver 1240. The processor 1210, the memory 1220, and the transceiver 1240 are connected to each other by using the bus system 1230.

Specifically, the processor is configured to invoke, by using the bus system 1230, code stored in the memory 1220, and determine a power control parameter of at least one carrier signal of at least two carrier signals, where the at least two carrier signals are signals sent on at least two aggregation carriers. The transceiver 1240 is configured to send the power control parameter of the at least one carrier signal to a first base station, so that user equipment controls a power of the at least one carrier signal according to the power control parameter, sent by the first base station, of the at least one carrier signal, where the power control parameter of the at least one carrier signal includes at least an interference power spectrum corresponding to the at least one carrier signal.

The methods disclosed in the foregoing embodiments of the present invention may be applied to the processor 1210, or be implemented by the processor 1210. The processor 1210 may be an integrated circuit chip and has a signal processing capability. In an implementation process, steps of the foregoing methods may be implemented by using an integrated logic circuit of hardware in the processor 1210 or instructions in a software form. The foregoing processor 1210 may be a general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, or a discrete hardware component, and may implement or execute the methods, steps, and logical block diagrams disclosed in the embodiments of the present invention. The general purpose processor may be a microprocessor, or the processor may be any conventional processor or the like. The steps of the methods disclosed with reference to the embodiments of the present invention may be directly executed and completed by using a hardware decoding processor, or may be executed and completed by using a combination of hardware and software modules in a decoding processor. The software module may be located in a mature storage medium in the field, such as a random access memory (Random Access Memory, RAM), a flash memory, a read-only memory (Read-Only Memory, ROM), a programmable read-only memory, an electrically erasable programmable memory, or a register. The storage medium is located in the memory 1220. The processor 1210 reads information in the memory 1220 and completes the steps in the foregoing methods in combination with hardware of the processor 1210. In addition to a data bus, the bus system 1230 may further include a power bus, a control bus, and a status signal bus. However, for clear description, various types of buses are marked as the bus system 1230 in the figure.

Therefore, according to this embodiment of the present invention, user equipment may receive a power control parameter sent by a base station, and the user equipment determines a magnitude of a channel gain according to the power control parameter, and further controls a power of a carrier signal according to the power control parameter and the magnitude of the channel gain, so as to effectively utilize a power resource of the user equipment and improve network performance.

It should be noted that the base station shown in FIG. 12 can implement processes implemented by the second base station in the method embodiments of FIG. 1 to FIG. 5. For other functions and operations of the base station 1200, reference may be made to the processes related to the second base station in the method embodiments of FIG. 1 to FIG. 5. For example, the base station in FIG. 12 is corresponding to the method embodiment of FIG. 5, and for other functions and operations of the base station 1200, reference may be made to processes related to the second base station in the method embodiment of FIG. 5. To avoid repetition, details are not described herein again.

It should be understood that in this specification, a term "and/or" is only an associative relationship for describing associated objects, indicating that three relationships may exist, for example, A and/or B, which may indicate three cases: A exists independently; both A and B exist; and B exists independently. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that in combination with the examples described in the embodiments disclosed in this specification, units and algorithm steps may be implemented by electronic hardware or a combination of computer software and electronic hardware. Whether the functions are performed in a manner of hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that for convenient and brief description, for a specific working process of the foregoing described system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the foregoing described apparatus embodiment is merely exemplary. For example, the unit division is merely logical function division and may be other division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such understanding, the technical solutions of the present invention essentially, or the part contributing to the prior art, or some of the technical solutions may be implemented in a form of a software product. The computer software product is stored in a storage medium, and includes some instructions for instructing a computer device (which may be a personal computer, a server, a network device, or the like) to execute all or some of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for controlling power, comprising:
   receiving, by a user equipment, power control parameters, from at least one base station, of at least two carrier signals, wherein the at least two carrier signals are signals carried on at least two aggregation carriers;
   determining, by the user equipment according to the power control parameters, channel gain reference quantities corresponding to the at least two carrier signals, to represent a magnitude of a channel gain according to a comparison of the channel gain reference quantities; and
   controlling, by the user equipment, power of the at least two carrier signals according to the magnitude of the channel gain.

2. The method according to claim 1, before the determining, by the user equipment according to the power control parameters, channel gain reference quantities corresponding to the at least two carrier signals, further comprising:
   determining, by the user equipment, that a sum of the power of the at least two carrier signals is greater than a maximum transmit power supported by the user equipment.

3. The method according to claim 1, wherein the controlling, by the user equipment, power of the at least two carrier signals according to the magnitude of the channel gain comprises:
   determining, by the user equipment, a carrier signal among the at last two carrier signals corresponding to a minimum channel gain reference quantity; and
   determining, by the user equipment, a power corresponding to a minimum bit error ratio that meets transmission of the carrier signal as a power of the carrier signal.

4. The method according to claim 1, wherein the at least one base station comprises a primary base station, the at least two carrier signals comprise a first carrier signal and a second carrier signal, and the receiving, by user equipment, power control parameters comprises:
   receiving, by the user equipment, a power control parameter of the first carrier signal and a power control parameter of the second carrier signal that are sent by the primary base station, wherein
   the power control parameter of the first carrier signal and the power control parameter of the second carrier signal are determined by the primary base station, or
   the power control parameter of the first carrier signal is determined by the primary base station, and the power control parameter of the second carrier signal is determined by a secondary base station and is sent to the primary base station.

5. The method according to claim 1, wherein the at least one base station comprises a primary base station and a secondary base station, the at least two carrier signals comprise a first carrier signal and a second carrier signal, and the receiving, by user equipment, power control parameters comprises:
   receiving, by the user equipment, a power control parameter, sent by the primary base station, of the first carrier signal; and
   receiving, by the user equipment, a power control parameter, sent by the secondary base station, of the second carrier signal.

6. The method according to claim 1, wherein the channel gain reference quantities corresponding to the at least two carrier signals comprise a first channel gain reference quantity corresponding to the first carrier signal and a second channel gain reference quantity corresponding to the second carrier signal;
   the power control parameters comprise $I\_psd\_1$, $G1$, $I\_psd\_2$, and $G2$, wherein $G1$ is a first path loss from the user equipment to the base station, $I\_psd\_1$ is an interference power spectrum of the user equipment on a first carrier frequency, $G2$ is a second path loss from the user equipment to the base station, and $I\_psd\_2$ is an interference power spectrum of the user equipment on a second carrier frequency; and the determining, by the user equipment according to the power control parameters, channel gain reference quantities corresponding to the at least two carrier signals comprises:

determining, by the user equipment, the first channel gain reference quantity according to the following formula:

$$\alpha 1 = G1/(I\_psd\_1 * \gamma 1)$$

wherein α1 is the first channel gain reference quantity, and γ1 is a first bit error ratio that meets transmission of the first carrier signal; and determining, by the user equipment, the second channel gain reference quantity according to the following formula:

$$\alpha 2 = G2/(I\_psd\_2 * \gamma 2)$$

wherein α2 is the second channel gain reference quantity, and γ2 is a second bit error ratio that meets transmission of the second carrier signal.

7. The method according to claim 6, wherein the controlling, by the user equipment, power of the at least two carrier signals according to the magnitude of the channel gain comprises:

determining that the first channel gain reference quantity is less than the second channel gain reference quantity;

determining a power of the first carrier signal according to the following formula:

$$P1 = P1\_min = P_{01} * (1 - \gamma 1)/G1$$

wherein P1 is the power of the first carrier signal, P1_min is a power corresponding to a minimum bit error ratio that meets transmission of the first carrier signal, and $P_{01}$ is an expected power value of the first carrier signal; and determining a power of the second carrier signal according to the following formula:

$$P2 = P\_ue\_max - P1$$

wherein P2 is the power of the second carrier signal, and P_ue_max is the maximum transmit power supported by the user equipment.

8. The method according to claim 6, wherein the controlling, by the user equipment, power of the at least two carrier signals according to the magnitude of the channel gain comprises:

determining that the first channel gain reference quantity is equal to the second channel gain reference quantity; and determining a power of the first carrier signal and a power of the second carrier signal according to the following formula:

$$P1 = P2 \cdot P\_ue\_max/2$$

wherein P1 is the power of the first carrier signal, P2 is the power of the second carrier signal, and P_ue_max is the maximum transmit power supported by the user equipment.

9. The method according to claim 1, wherein the at least two carrier signals are carrier signals of different radio access technology.

10. A user equipment, comprising:
a transceiver to receive power control parameters, from at least one base station, of at least two carrier signals, wherein the at least two carrier signals are signals sent on at least two aggregation carriers;
a processor to,
determine, according to the power control parameters, channel gain reference quantities corresponding to the at least two carrier signals to represent a magnitude of a channel gain according to a comparison of the channel gain reference quantities; and
control power of the at least two carrier signals according a comparison of to the magnitude of the channel gain.

11. The user equipment according to claim 10, wherein:
the processor is to determine that a sum of the power of the at least two carrier signals is greater than a maximum transmit power supported by the user equipment.

12. The user equipment according to claim 10, wherein to control the power of the at least two carrier signals, the processor determines a carrier signal among the at least two carrier signals corresponding to a minimum channel gain reference quantity, and determines a power corresponding to a minimum bit error ratio that meets transmission of the carrier signal as a power of the carrier signal.

13. The user equipment according to claim 10, wherein the at least one base station comprises a primary base station, the at least two carrier signals comprise a first carrier signal and a second carrier signal, and
the transceiver is to receive a power control parameter of the first carrier signal and a power control parameter of the second carrier signal that are sent by the primary base station, wherein
the power control parameter of the first carrier signal and the power control parameter of the second carrier signal are determined by the primary base station, or
the power control parameter of the first carrier signal is determined by the primary base station, and the power control parameter of the second carrier signal is determined by a secondary base station and is sent to the primary base station.

14. The user equipment according to claim 10, wherein the at least one base station comprises a primary base station and a secondary base station, the at least two carrier signals comprise a first carrier signal and a second carrier signal, and
the transceiver is to receive a power control parameter, sent by the primary base station, of the first carrier signal, and receive a power control parameter sent by the secondary base station, of the second carrier signal.

15. The user equipment according to claim 10, wherein the channel gain reference quantities corresponding to the at least two carrier signals comprise a first channel gain reference quantity corresponding to the first carrier signal and a second channel gain reference quantity corresponding to the second carrier signal;
the power control parameters comprise I_psd_1, G1, I_psd_2, and G2, wherein G1 is a first path loss from the user equipment to the base station, I_psd_1 is an interference power spectrum of the user equipment on a first carrier frequency, G2 is a second path loss from the user equipment to the base station, and I_psd_2 is an interference power spectrum of the user equipment on a second carrier frequency;
the processor determines the first channel gain reference quantity according to the following formula:

$$\alpha 1 = G1/(I\_psd\_1 * \gamma 1)$$

wherein α1 is the first channel gain reference quantity, and γ1 is a first bit error ratio that meets transmission of the first carrier signal; and
the processor determines the second channel gain reference quantity according to the following formula:

$$\alpha 2 = G2/(I\_psd\_2 * \gamma 2)$$

wherein α2 is the second channel gain reference quantity, and γ2 is a second bit error ratio that meets transmission of the second carrier signal.

16. The user equipment according to claim 15, wherein to control the power of the at least two carrier signals, the processor determines that the first channel gain reference quantity is less than the second channel gain reference quantity; determines a power of the first carrier signal according to the following formula:

$$P1 = P1\_min = P_{0i} * (1-\gamma1)/G1$$

wherein P1 is the power of the first carrier signal, P1_min is a power corresponding to a minimum bit error ratio that meets transmission of the first carrier signal, and Poi is an expected power value of the first carrier signal; and determines a power of the second carrier signal according to the following formula:

$$P2 = P\_ue\_max - P1$$

wherein P2 is the power of the second carrier signal, and P_ue_max is the maximum transmit power supported by the user equipment.

17. The user equipment according to claim 15, wherein to control the power of the at least two carrier signals, the processor determines that the first channel gain reference quantity is equal to the second channel gain reference quantity, and determines a power of the first carrier signal and a power of the second carrier signal according to the following formula:

$$P1 = P2 = P\_ue\_max/2$$

wherein P1 is the power of the first carrier signal, P2 is the power of the second carrier signal, and P_ue_max is the maximum transmit power supported by the user equipment.

18. The user equipment according to claim 10, wherein the at least two carrier signals are carrier signals of different radio access technology.

19. A base station, comprising:
a processor to determine a power control parameter of at least one carrier signal of at least two carrier signals, wherein the at least two carrier signals are signals sent on at least two aggregation carriers; and
a transceiver to send the power control parameter of the at least one carrier signal to a user equipment (UE), wherein the power control parameter of the at least one carrier signal comprises at least an interference power spectrum corresponding to the at least one carrier signal, to control the UE to determine channel gain reference quantities corresponding to the at least two carrier signals to perform a comparison of the channel gain reference quantities to represent a magnitude of the channel gain used to control power of the at least two carrier signals.

20. The base station according to claim 19, wherein the at least two carrier signals comprise a first carrier signal and a second carrier signal, the power control parameter of the at least one carrier signal comprises a power control parameter of the first carrier signal and a power control parameter of the second carrier signal, and
the processor is to determine the power control parameter of the first carrier signal, and receive the power control parameter, from a second base station, of the second carrier signal.

* * * * *

UNITED STATES PATENT AND TRADEMARK OFFICE
CERTIFICATE OF CORRECTION

PATENT NO. : 10,251,135 B2
APPLICATION NO. : 15/346196
DATED : April 2, 2019
INVENTOR(S) : Tong Wu et al.

Page 1 of 1

It is certified that error appears in the above-identified patent and that said Letters Patent is hereby corrected as shown below:

In the Claims

Column 30, Line 20:
In Claim 3, delete "at last" and insert -- at least --, therefor.

Column 31, Line 51 (approx.):
In Claim 8, delete "$P1=P2 \cdot P\_ue\_max/2$" and insert
-- $P1=P2= P\_ue\_max/2$ --, therefor.

Column 32, Line 40 (approx.):
In Claim 14, delete "parameter" and insert -- parameter, --, therefor.

Column 33, Line 16 (approx.):
In Claim 16, delete "Poi" and insert -- $P_{01}$ --, therefor.

Signed and Sealed this
Nineteenth Day of November, 2019

Andrei Iancu
*Director of the United States Patent and Trademark Office*